US012139819B2

(12) United States Patent
Ono et al.

(10) Patent No.: US 12,139,819 B2
(45) Date of Patent: Nov. 12, 2024

(54) WET SPUN FIBERS, WET FORMED FILM, AND PRODUCTION METHOD THEREFOR

(71) Applicant: NATIONAL UNIVERSITY CORPORATION OKAYAMA UNIVERSITY, Okayama (JP)

(72) Inventors: Tsutomu Ono, Okayama (JP); Takaichi Watanabe, Okayama (JP)

(73) Assignee: NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 782 days.

(21) Appl. No.: 17/279,947

(22) PCT Filed: Sep. 30, 2019

(86) PCT No.: PCT/JP2019/038576
§ 371 (c)(1),
(2) Date: Dec. 29, 2021

(87) PCT Pub. No.: WO2020/067570
PCT Pub. Date: Apr. 2, 2020

(65) Prior Publication Data
US 2022/0154369 A1 May 19, 2022

(30) Foreign Application Priority Data
Sep. 28, 2018 (JP) ................................ 2018-183868

(51) Int. Cl.
*D01F 2/02* (2006.01)
*D01D 4/02* (2006.01)
(Continued)

(52) U.S. Cl.
CPC ................ *D01D 4/02* (2013.01); *D01D 5/06* (2013.01); *D01F 2/00* (2013.01); *D01F 6/60* (2013.01);
(Continued)

(58) Field of Classification Search
CPC .... D01D 5/06; D01F 2/02; D01F 2/24; D01F 2/28; D01F 6/04; D01F 6/10; D01F 6/14;
(Continued)

(56) References Cited

U.S. PATENT DOCUMENTS 6,245,876 B1 6/2001 Hanahata et al.
2002/0113335 A1* 8/2002 Lobovsky ............... D01D 5/06 264/184 X
(Continued)

FOREIGN PATENT DOCUMENTS

CN 103154338 6/2013
JP 34-6058 7/1959
(Continued)

OTHER PUBLICATIONS

International Search Report issued Dec. 10, 2019 in International (PCT) Application No. PCT/JP2019/038576.
(Continued)

*Primary Examiner* — Leo B Tentoni
(74) *Attorney, Agent, or Firm* — Wenderoth, Lind & Ponack, L.L.P.

(57) ABSTRACT

The method for producing wet spun fibers/a wet formed film using a double-walled pipe type micronozzle apparatus according to the present invention is a production method, wherein, in a step of extruding an internal phase comprising a fiber/film material and a good solvent for the fiber/film material in a linear form from the circular/rectangular end of the internal pipe of the apparatus into an external phase comprising a poor solvent for the fiber/film material, the external phase flowing in the external pipe of the apparatus, the ratio of the external phase flow rate to the internal phase flow rate is set to 1 or more, and further for the wet spun
(Continued)

fibers, the external phase line speed at the orifice portion at which the internal phase and the external phase merge is set to 0.1 $ms^{-1}$ or more.

6 Claims, 19 Drawing Sheets

(51) Int. Cl.

| | |
|---|---|
| ***D01D 5/06*** | (2006.01) |
| ***D01F 2/00*** | (2006.01) |
| ***D01F 2/24*** | (2006.01) |
| ***D01F 2/28*** | (2006.01) |
| ***D01F 6/04*** | (2006.01) |
| ***D01F 6/10*** | (2006.01) |
| ***D01F 6/14*** | (2006.01) |
| ***D01F 6/22*** | (2006.01) |
| ***D01F 6/60*** | (2006.01) |
| ***D01F 6/62*** | (2006.01) |
| ***D01F 9/12*** | (2006.01) |
| ***D01F 9/22*** | (2006.01) |
| ***D04H 1/724*** | (2012.01) |
| ***D04H 3/033*** | (2012.01) |

(52) U.S. Cl.
CPC .................. *D01F 6/62* (2013.01); *D01F 9/12* (2013.01); *D04H 1/724* (2013.01); *D04H 3/033* (2013.01); *D10B 2101/12* (2013.01); *D10B 2201/22* (2013.01); *D10B 2201/28* (2013.01); *D10B 2321/02* (2013.01); *D10B 2321/041* (2013.01); *D10B 2321/06* (2013.01); *D10B 2321/08* (2013.01); *D10B 2321/121* (2013.01); *D10B 2331/02* (2013.01); *D10B 2331/04* (2013.01)

(58) Field of Classification Search
CPC ..... D01F 6/22; D01F 6/60; D01F 6/62; D01F 9/12; D01F 9/22; D10B 2101/12; D10B 2201/22; D10B 2201/28; D10B 2321/02; D10B 2321/041; D10B 2321/06; D10B 2321/08; D10B 2321/121; D10B 2331/02; D10B 2331/04
USPC ....... 264/178 F, 184, 185, 187, 200, 331.17, 264/331.18, 331.19, 331.21, 561, 563
See application file for complete search history.

(56) References Cited

U.S. PATENT DOCUMENTS

| | | | |
|---|---|---|---|
| 2010/0247908 | A1 | 9/2010 | Velev et al. |
| 2013/0157367 | A1 | 6/2013 | Ono et al. |
| 2013/0251619 | A1 | 9/2013 | Rikihisa et al. |
| 2015/0354094 | A1 | 12/2015 | Parker et al. |

FOREIGN PATENT DOCUMENTS

| | | |
|---|---|---|
| JP | 49-41127 | 11/1974 |
| JP | 60-246806 | 12/1985 |
| JP | 2003-328229 | 11/2003 |
| JP | 2012-126635 | 7/2012 |
| JP | 2015-4151 | 1/2015 |
| JP | 2018-119224 | 8/2018 |
| WO | 98/38364 | 9/1998 |
| WO | 2012/029710 | 3/2012 |
| WO | 2017/102989 | 6/2017 |

OTHER PUBLICATIONS

Kobayashi et al., "Preparation of stripe-patterned heterogeneous hydrogel sheets using microfluidic devices for high-density coculture of hepatocytes and fibroblasts", Journal of Bioscience and Bioengineering, vol. 116, No. 6, 2013, pp. 761-767.
Office Action issued Mar. 11, 2022 in Chinese Patent Application No. 201980063750.4, with English-language translation.

* cited by examiner

[Fig 1]
[A]
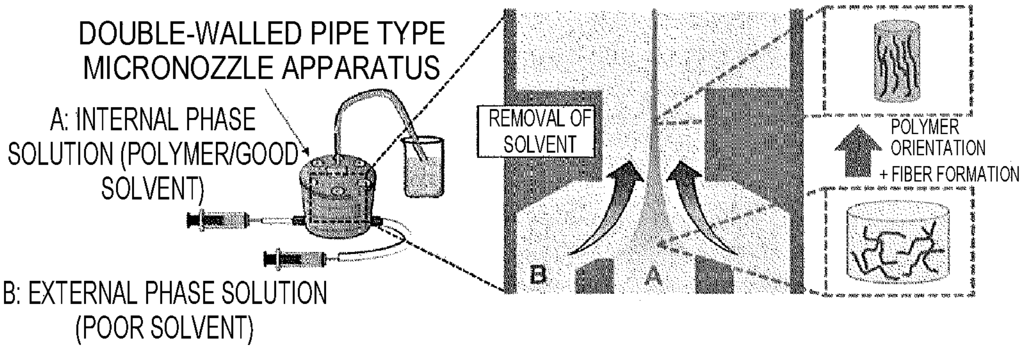
[B]
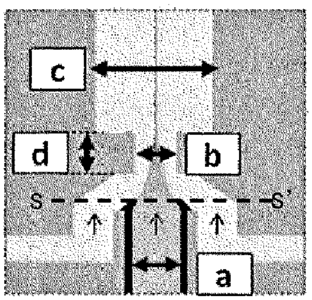
| | |
|---|---|
| a | 130 μm |
| b | 200 μm |
| c | 500 μm |
| d | 1,000 μm |
[C]
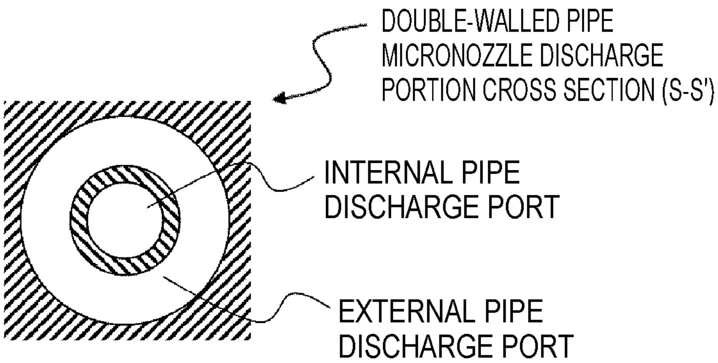

[Fig. 2]
[A]
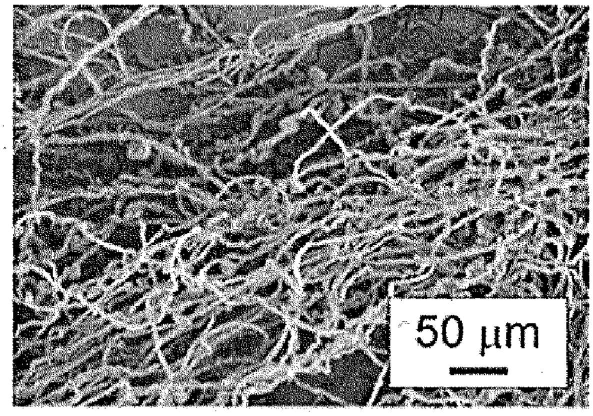
[B]
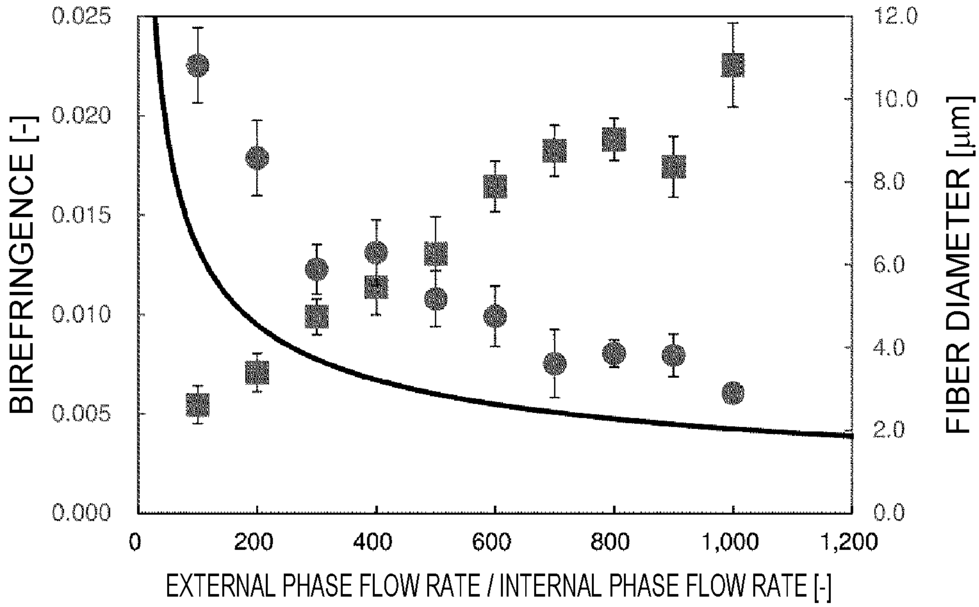

[Fig. 3]
[A]
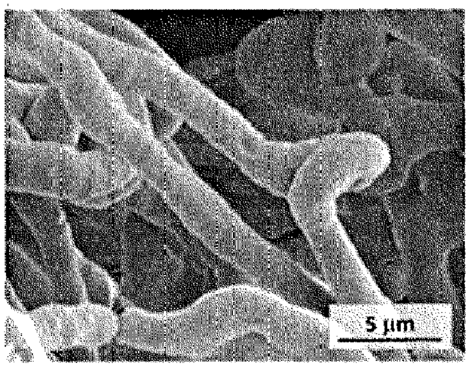
[B]
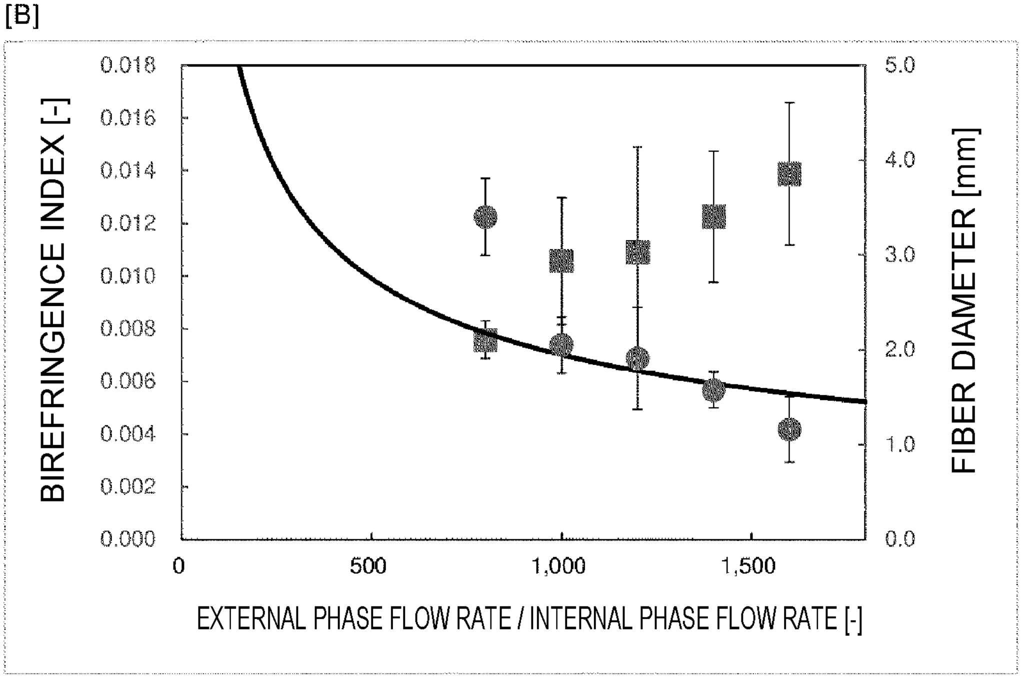

[Fig. 4]
[A]
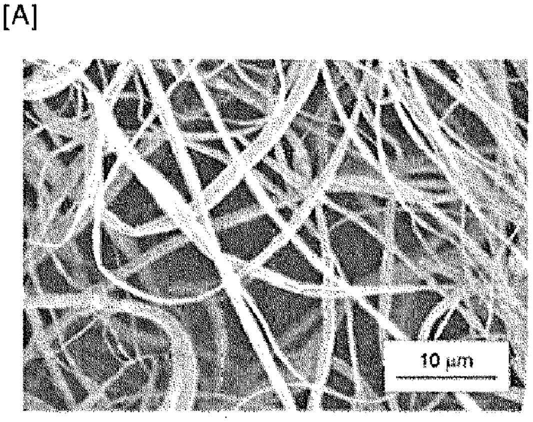
[B]
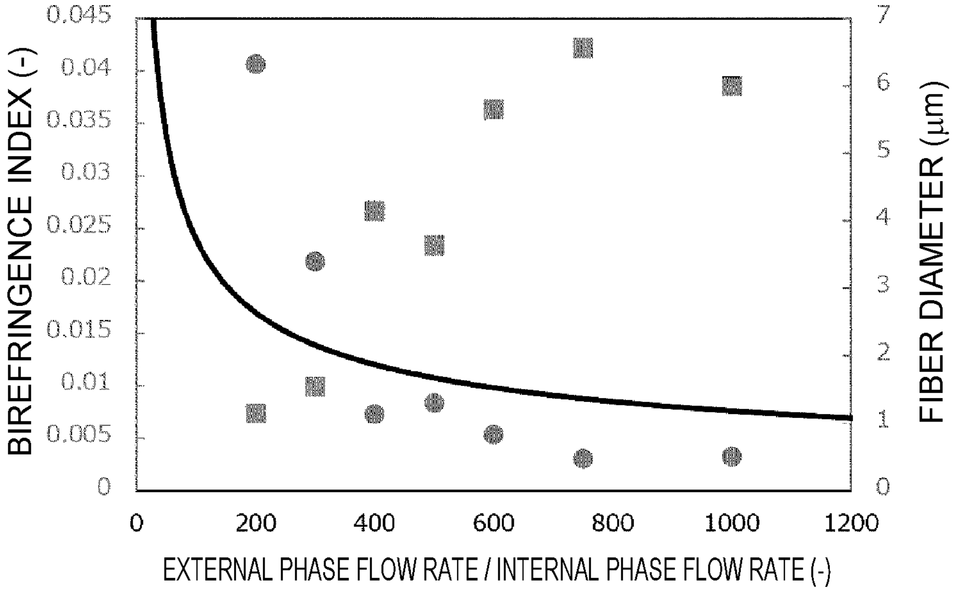

[Fig. 5]
[A]
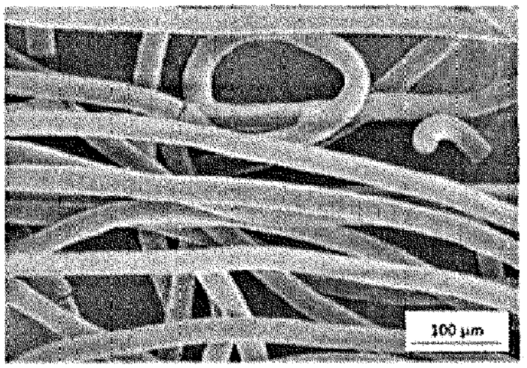
[B]
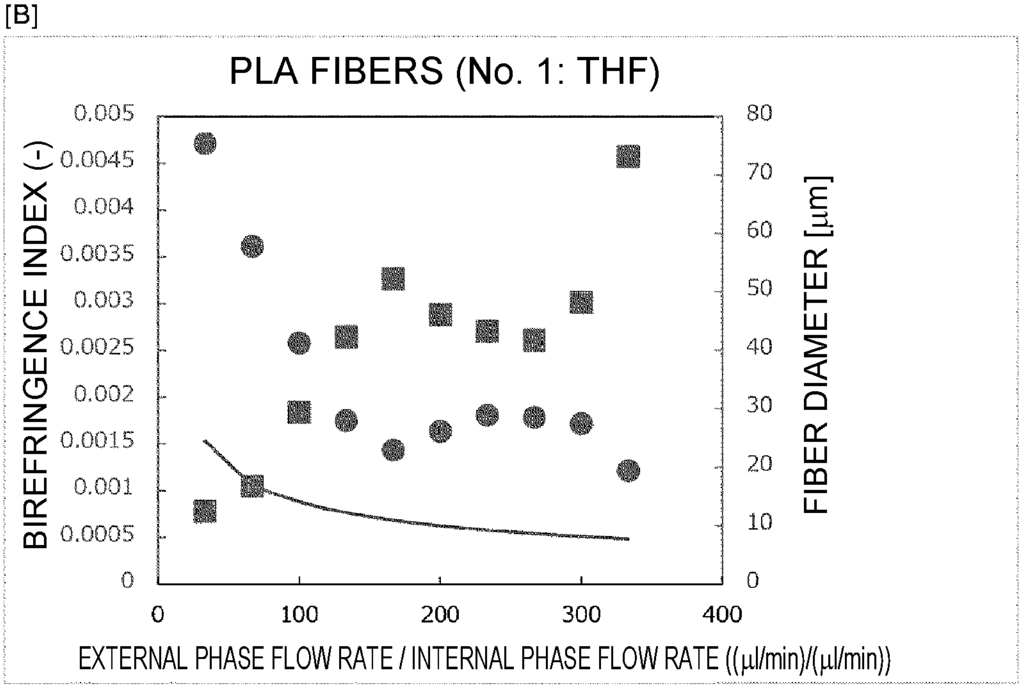

[Fig. 6]
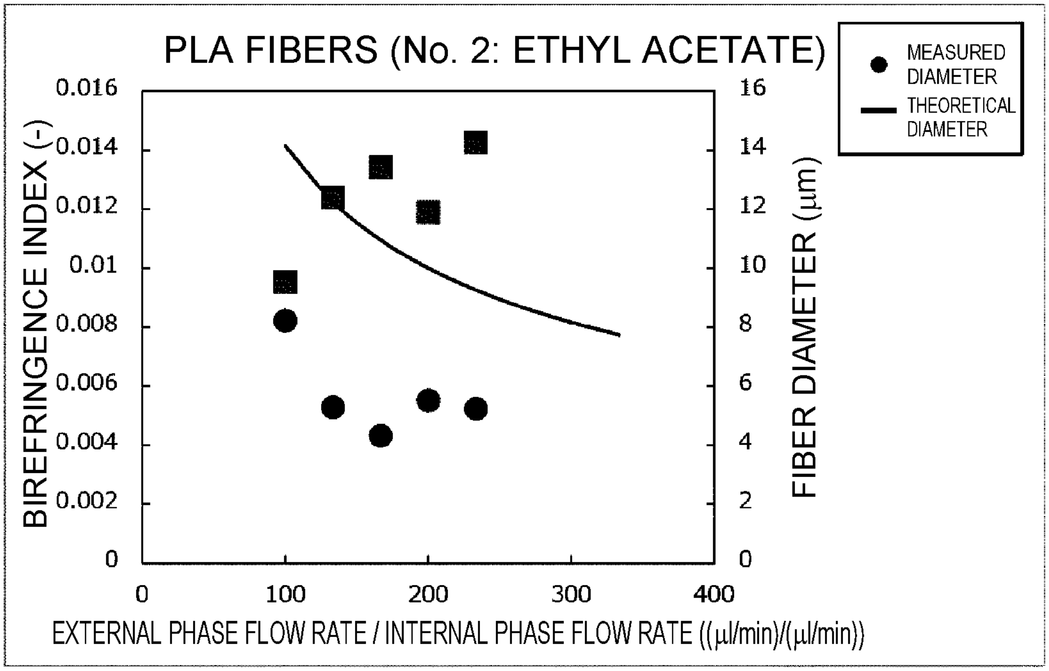
[Fig. 7]
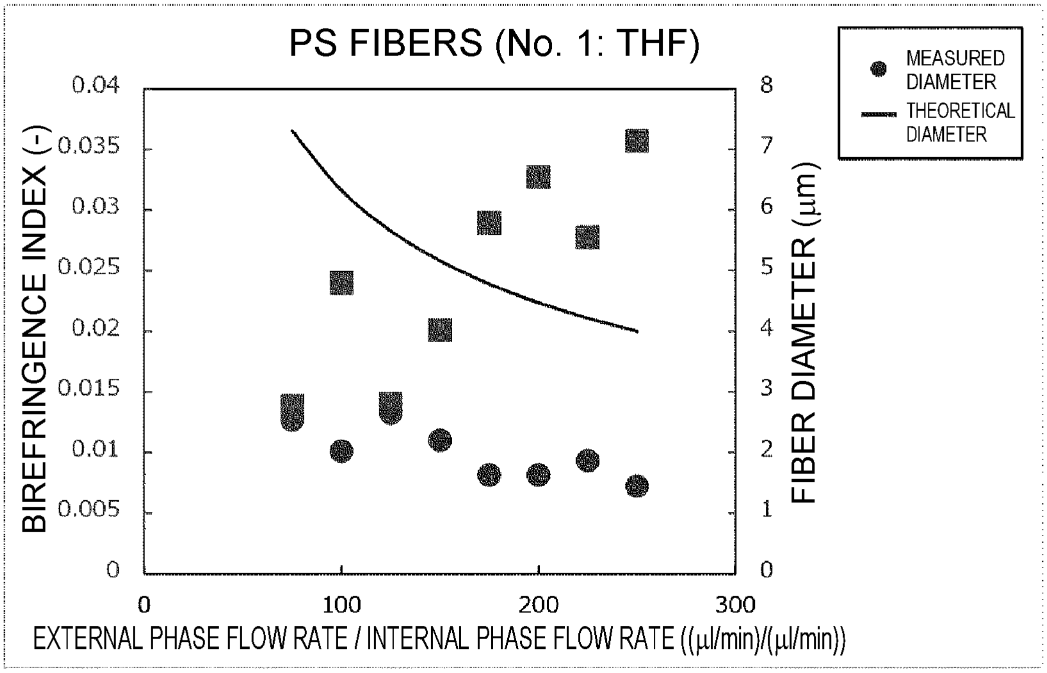

[Fig. 8]
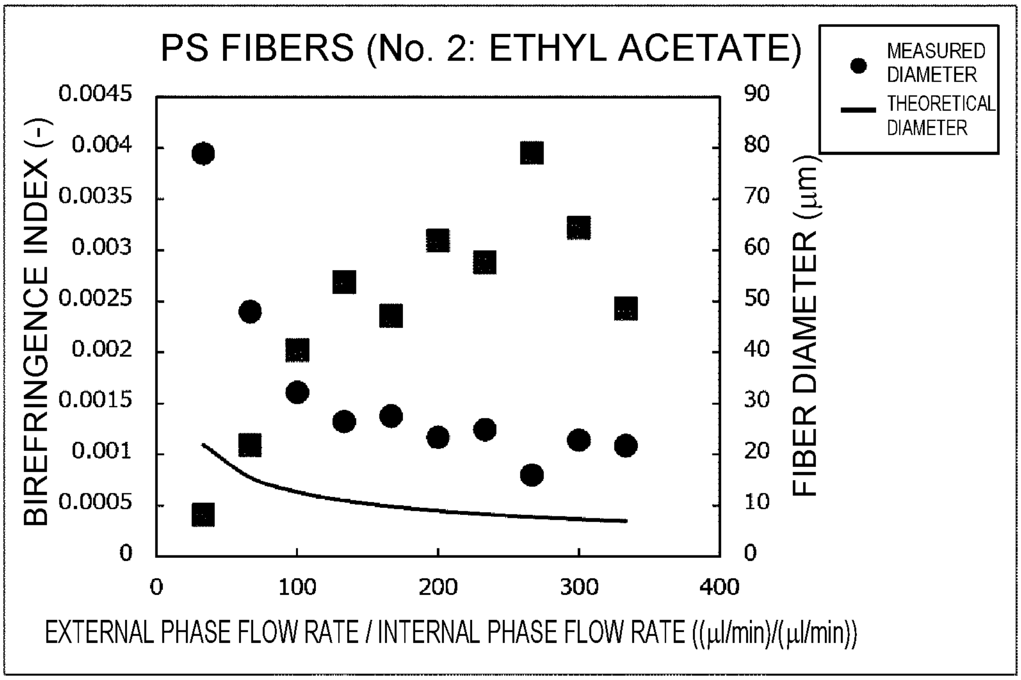
[Fig. 9]
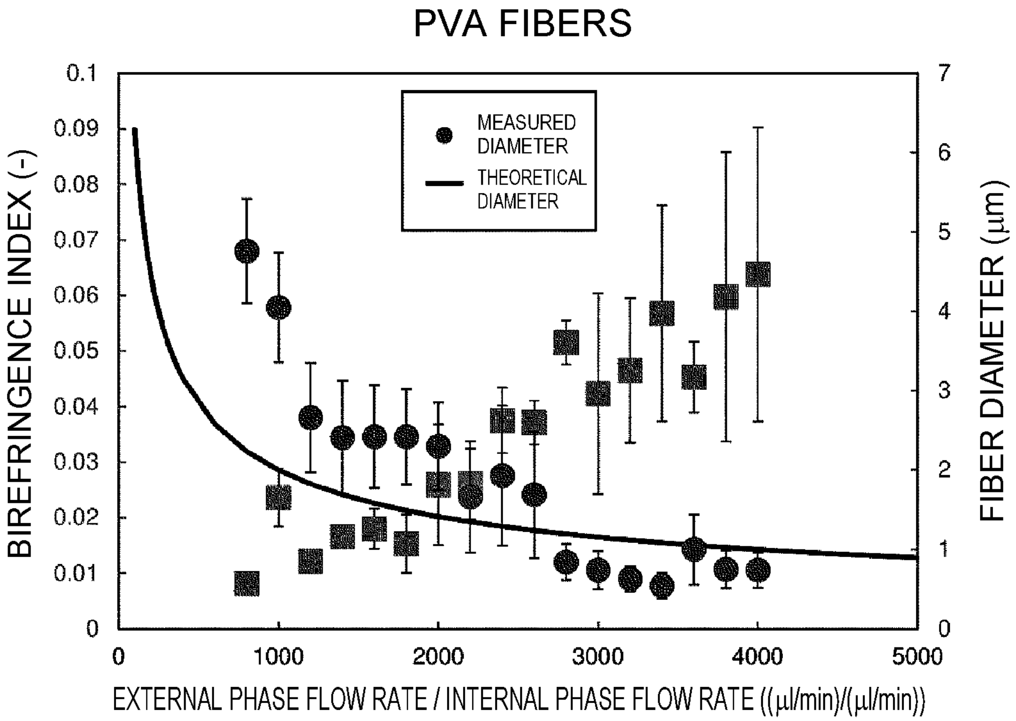

[Fig. 10]
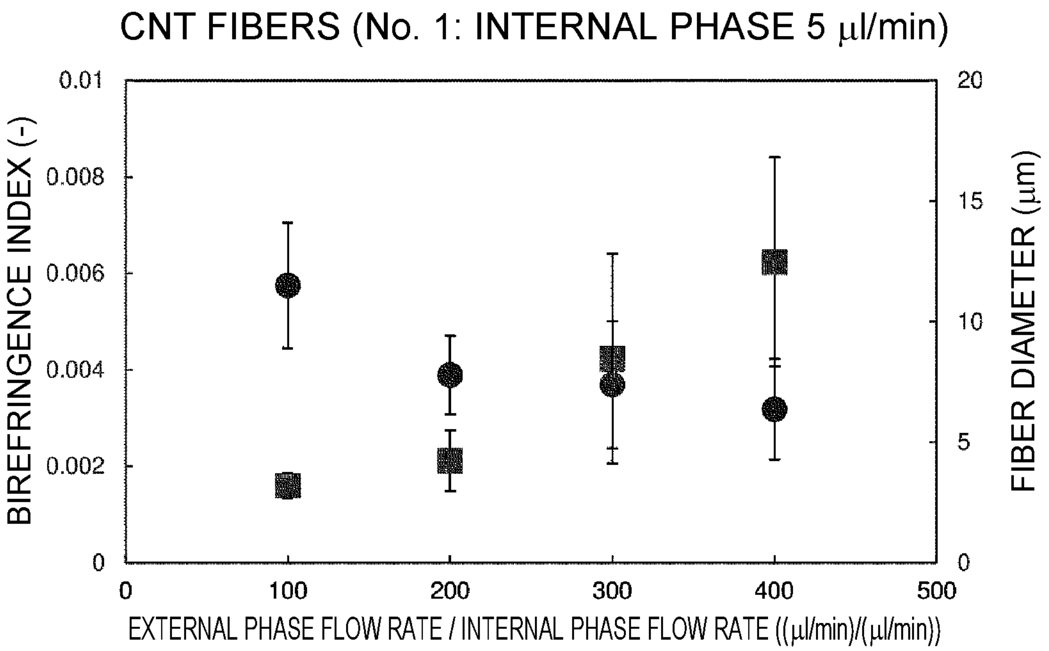
[Fig. 11]
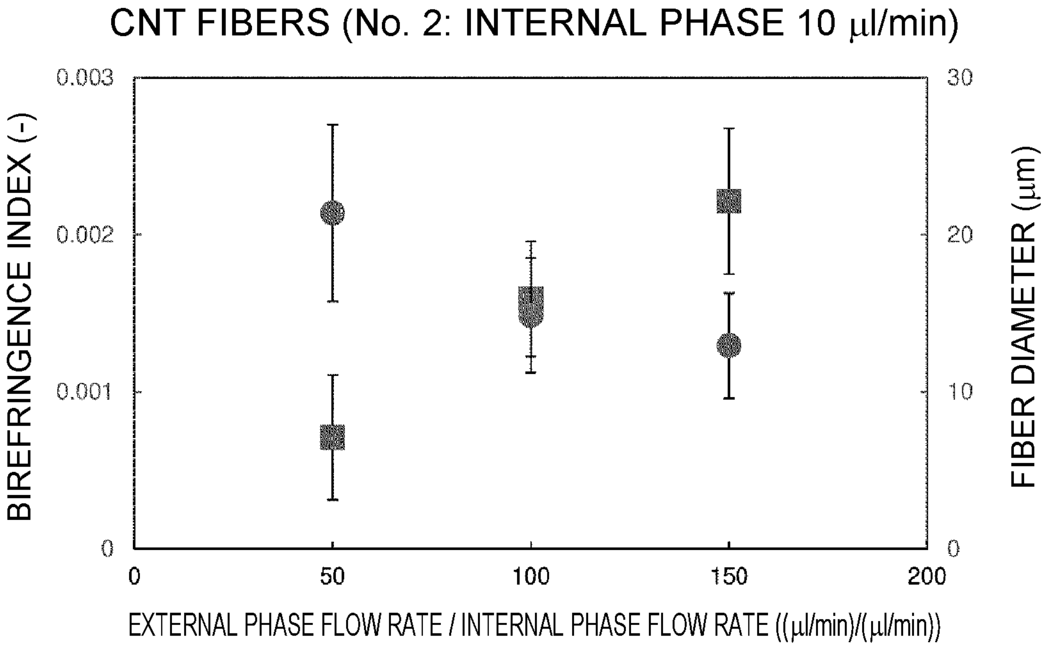

[Fig. 12]
[A]
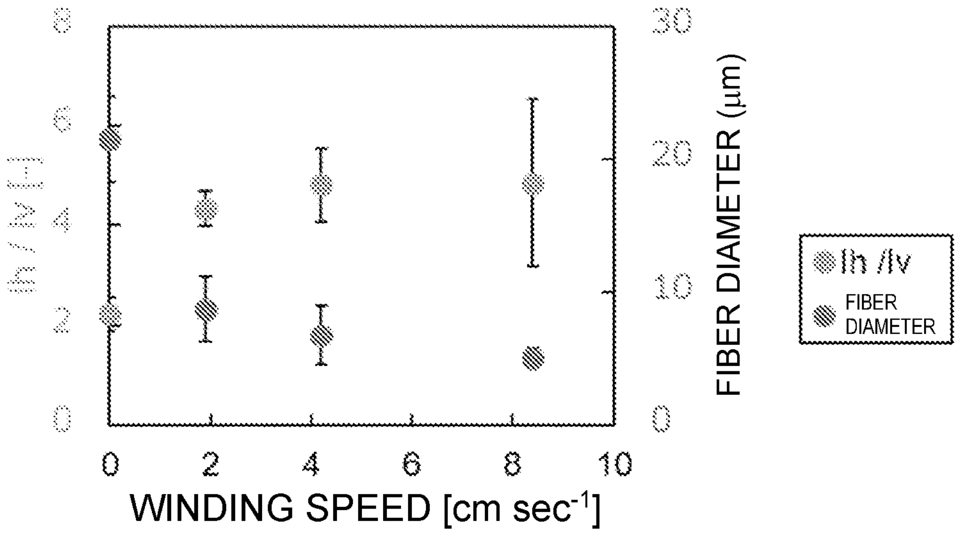
[B]
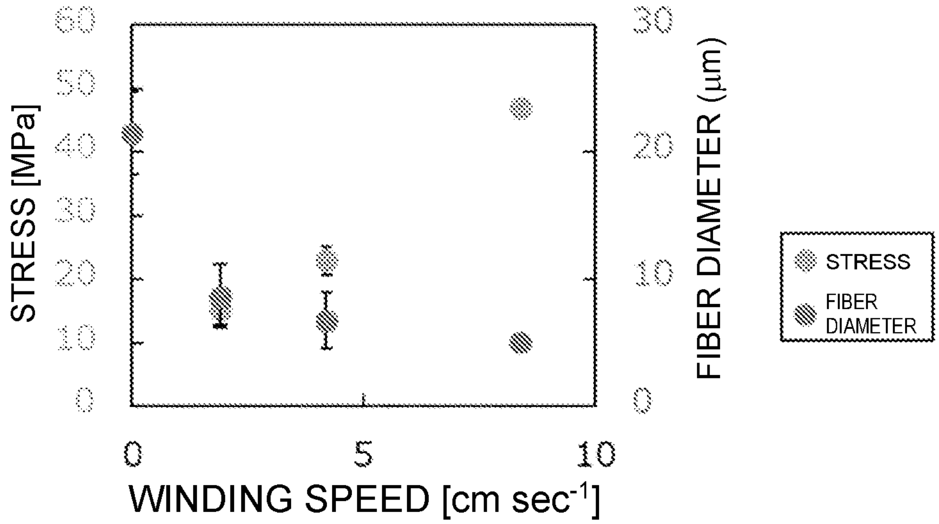

[Fig. 13]
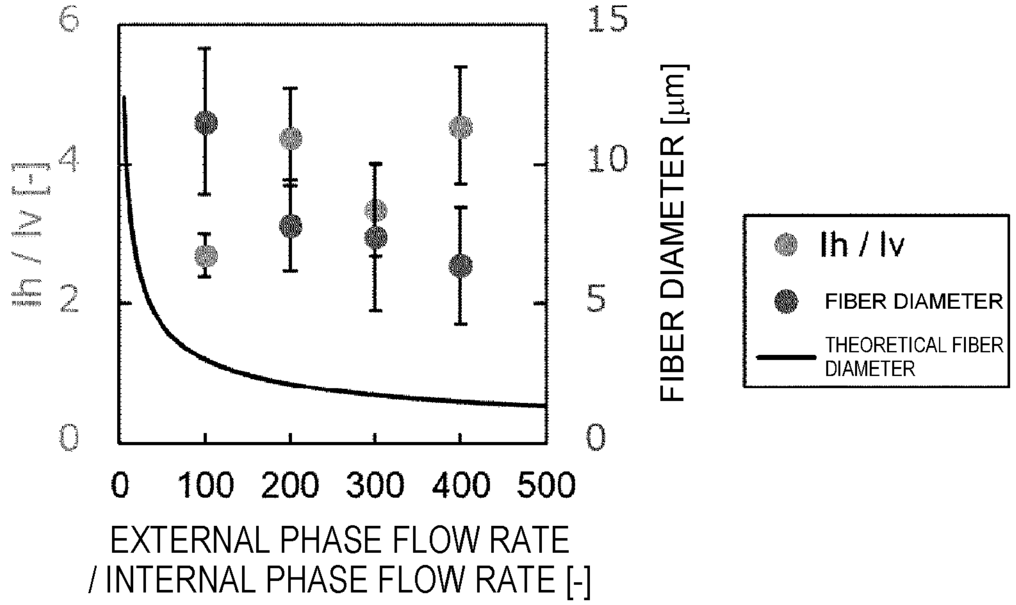
[Fig. 14]
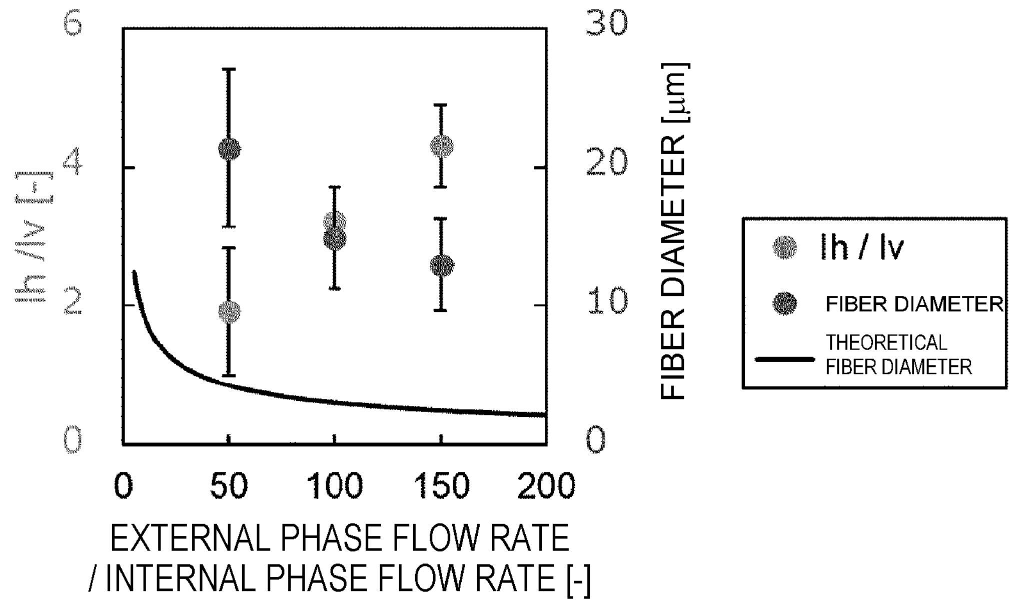

[Fig. 15]
[A]
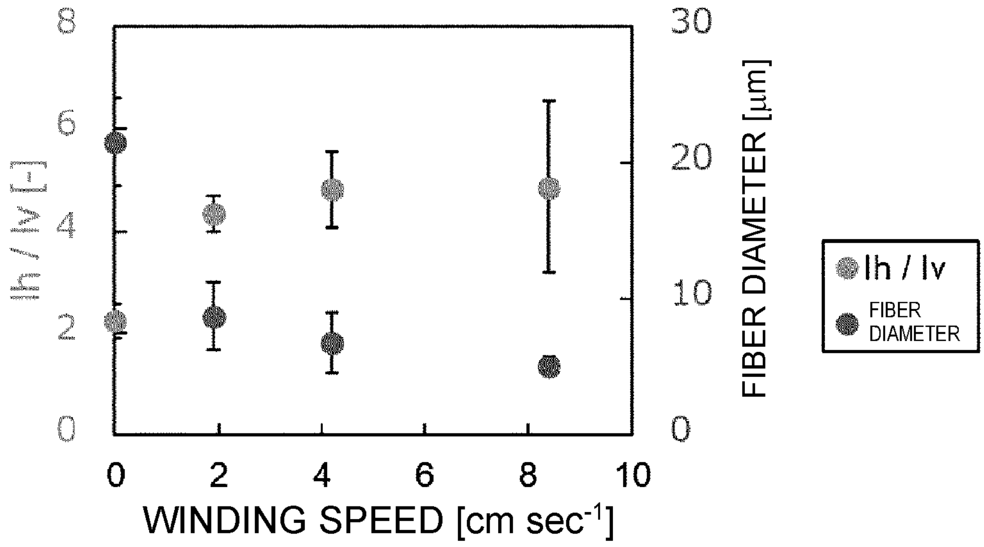
[B]
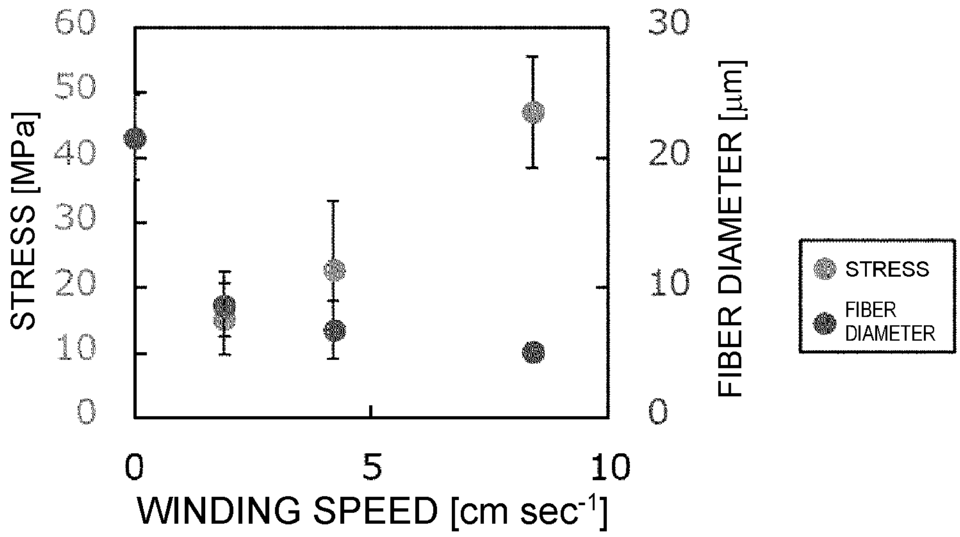

[Fig. 16]
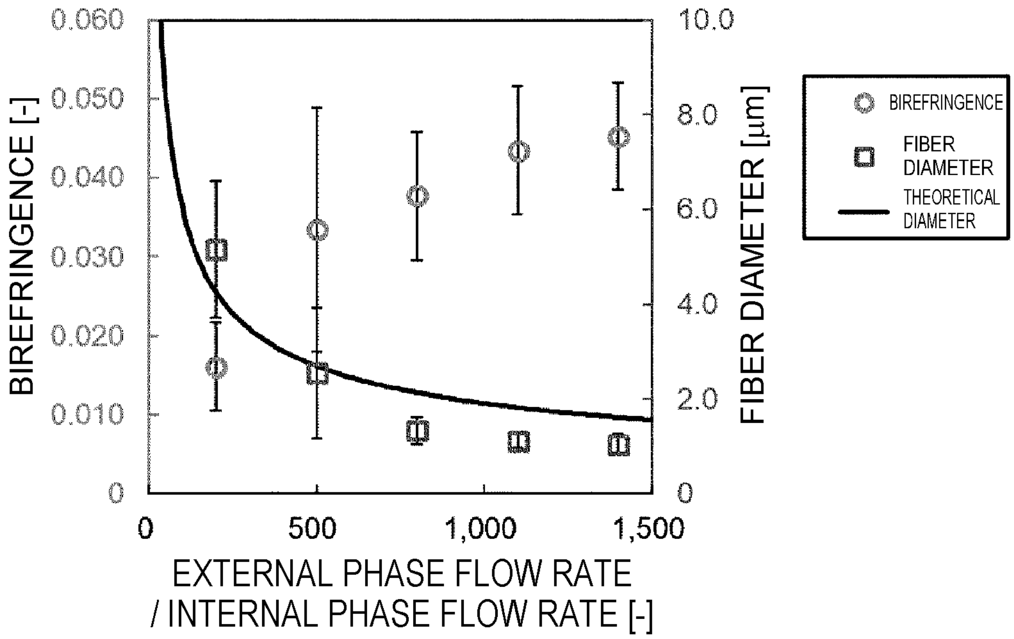
[Fig. 17]
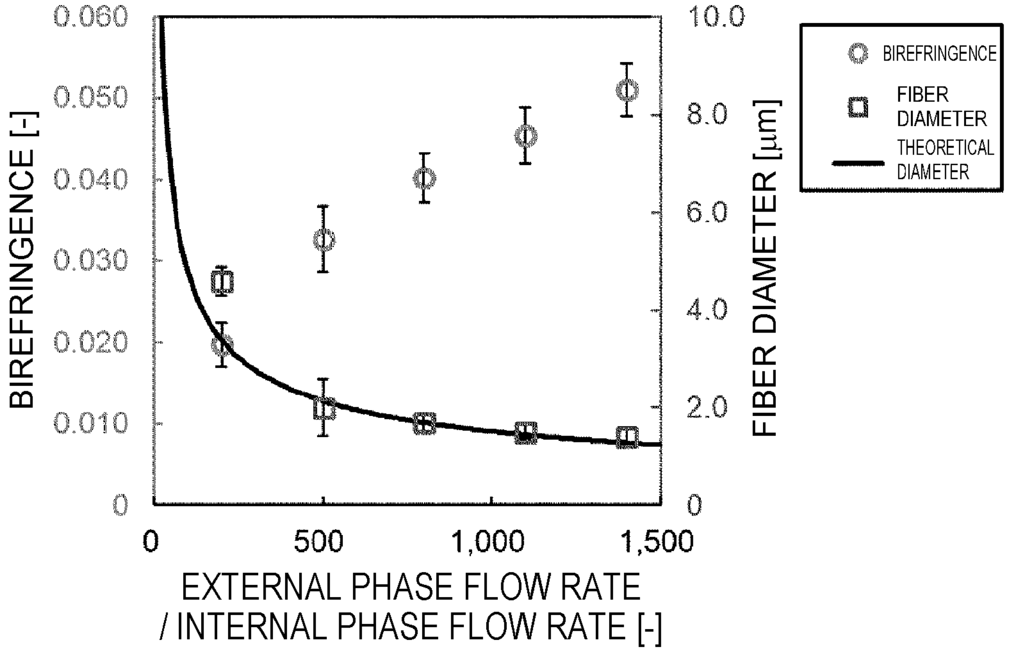

[Fig. 18]
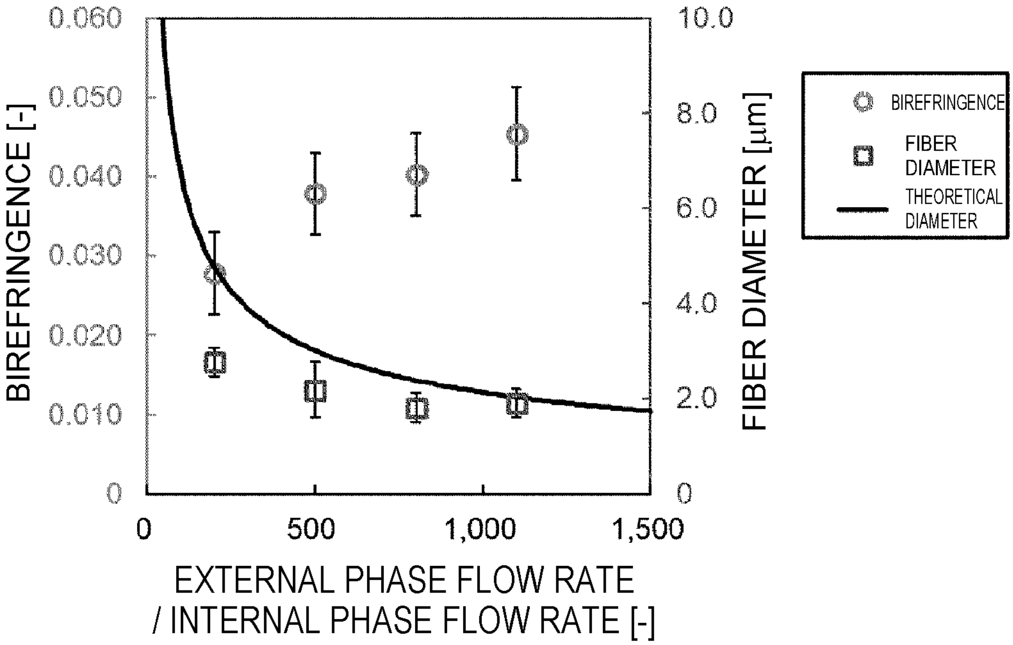
[Fig. 19]
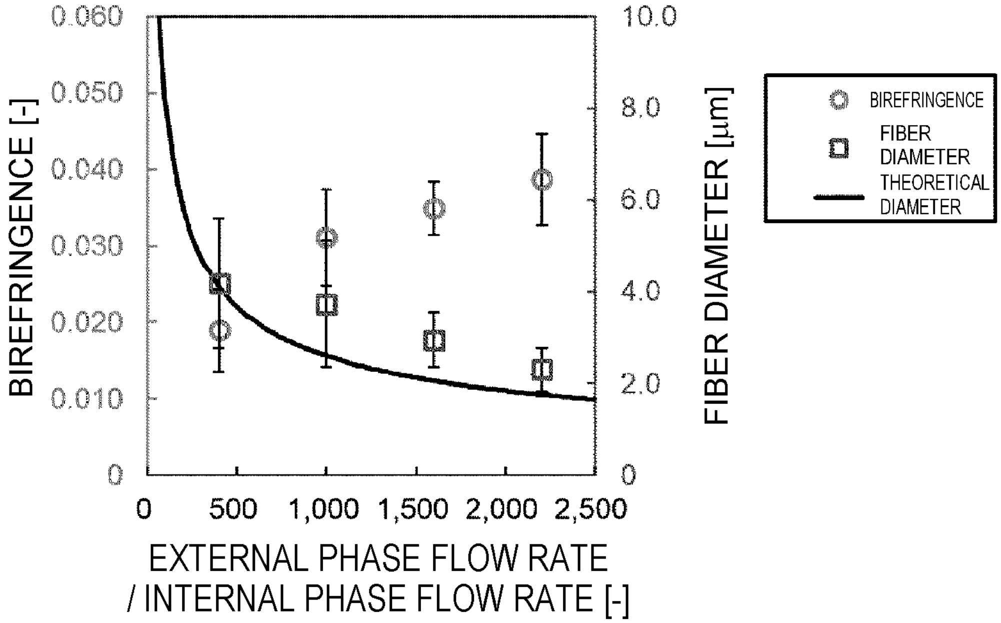

[Fig. 20]
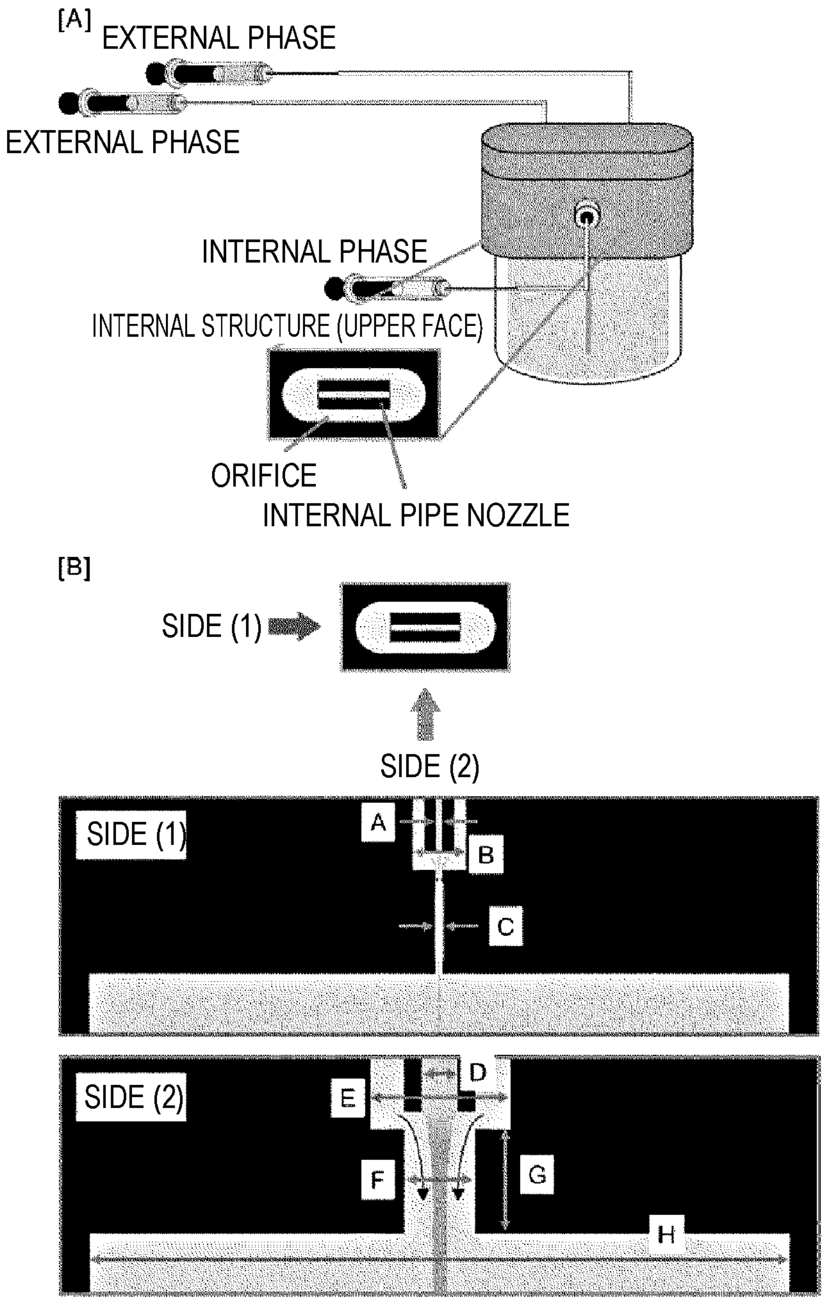
| LENGTH [μm] | | LENGTH [μm] | |
|---|---|---|---|
| A | 150 | E | 4,000 |
| B | 1,500 | F | 2,000 |
| C | 200 | G | 3,000 |
| D | 1,000 | H | ϕ20,000 |

[Fig. 21]
[A]
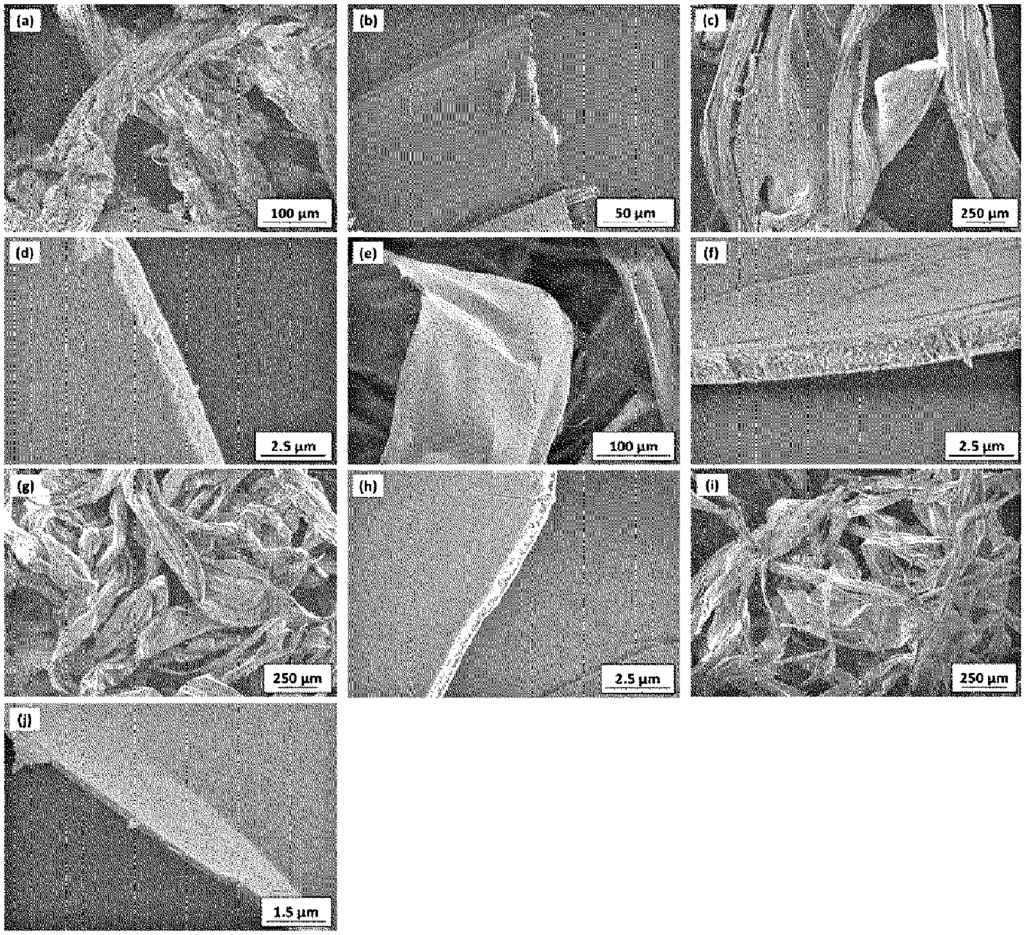
[B]
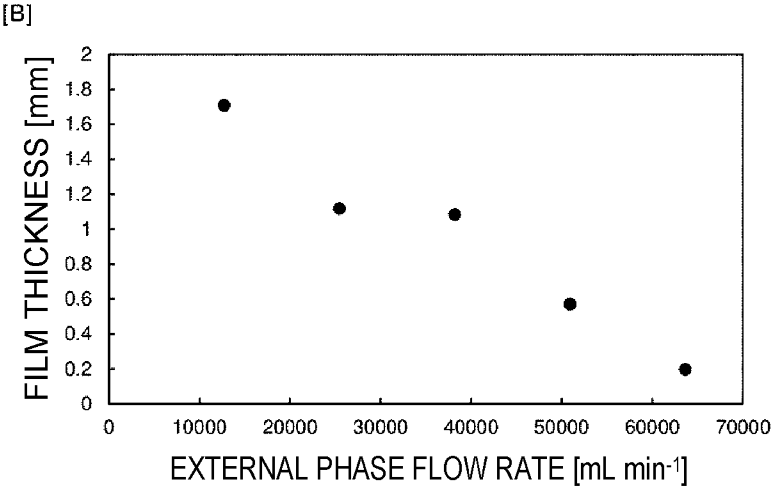

[Fig. 22]
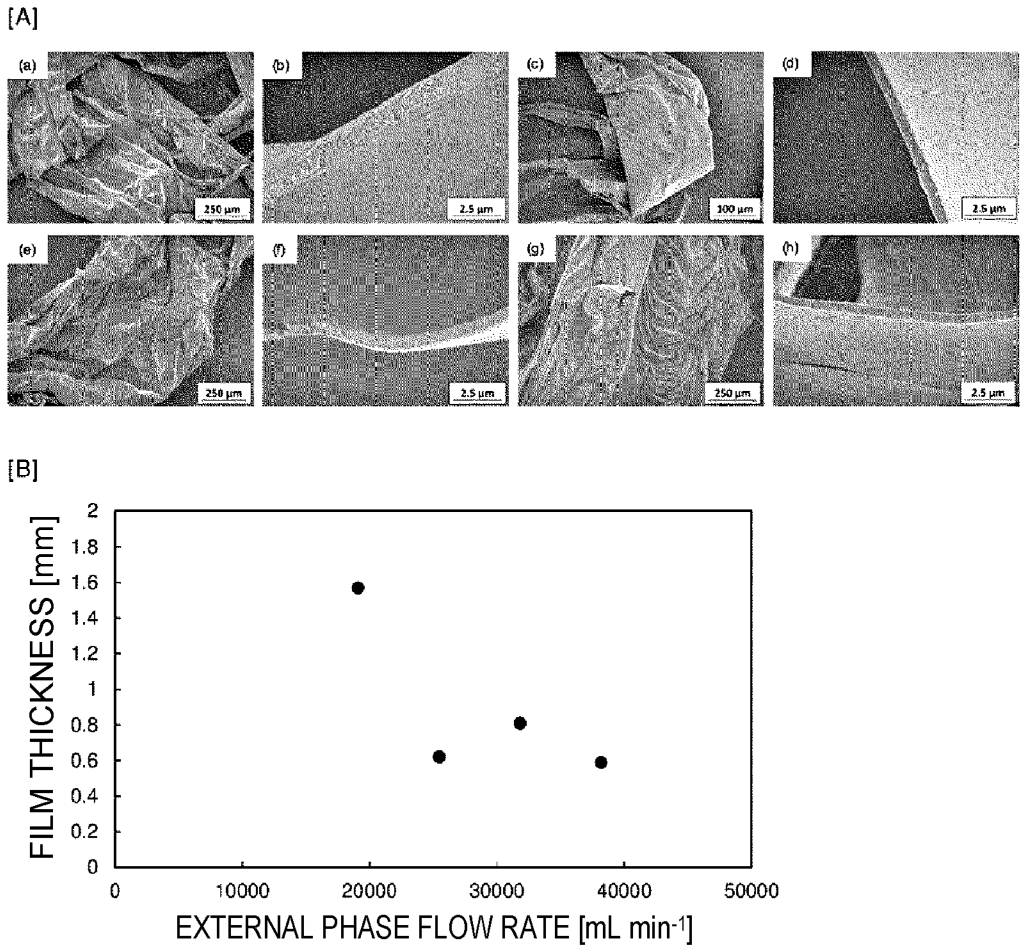
[Fig. 23]
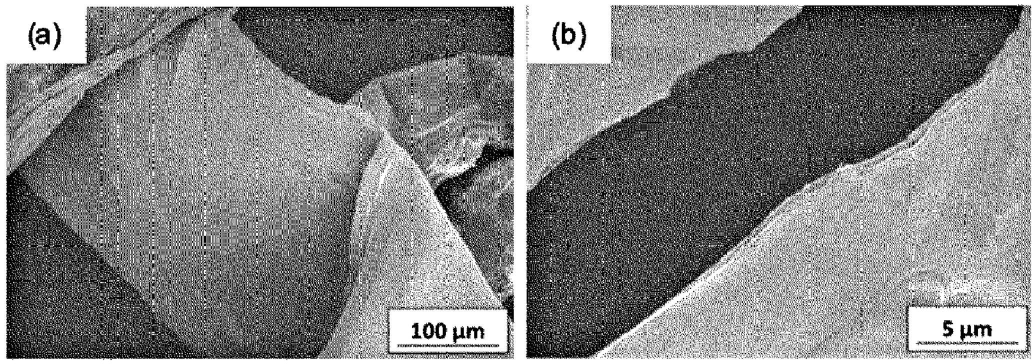

[Fig. 24]
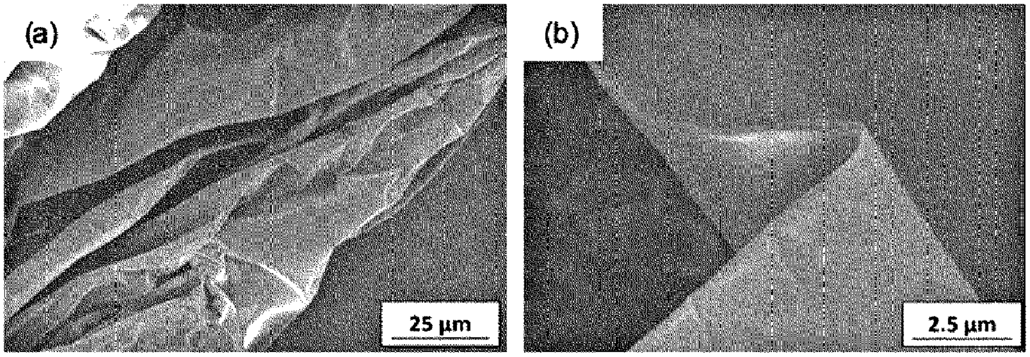

[Fig. 25]
[A]
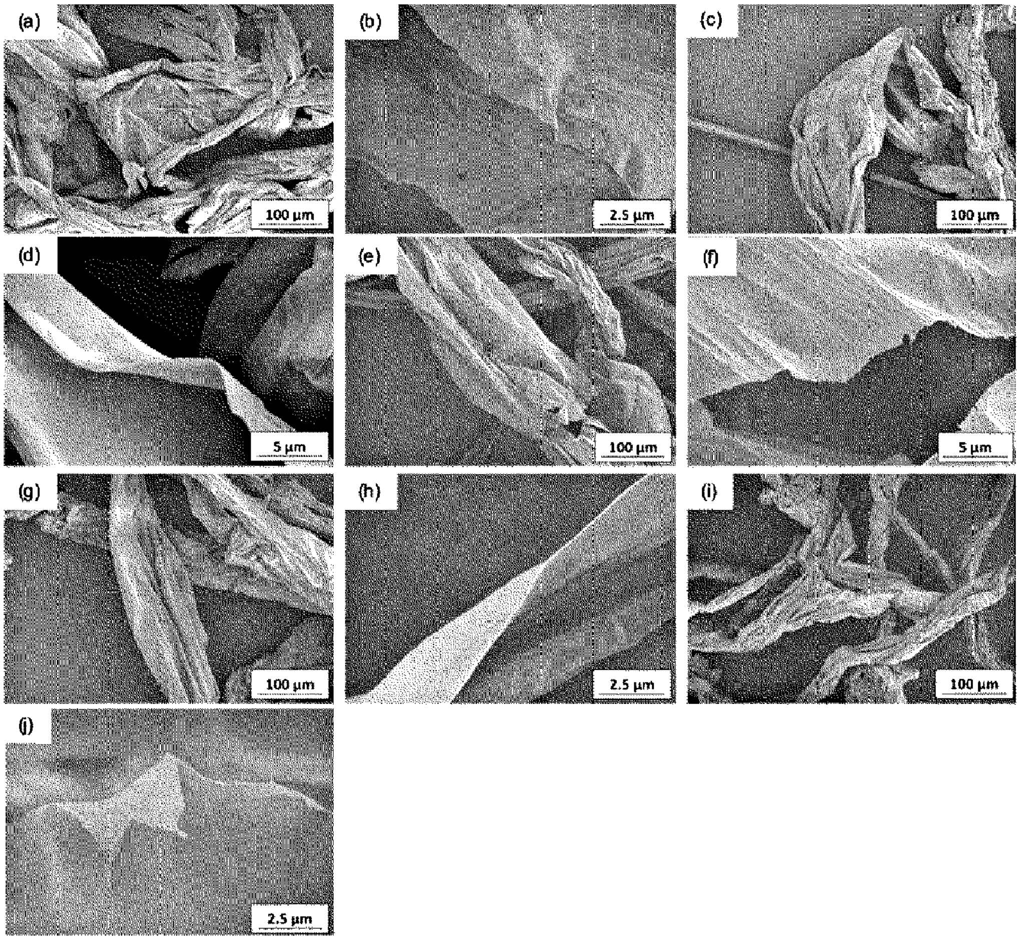
[B]
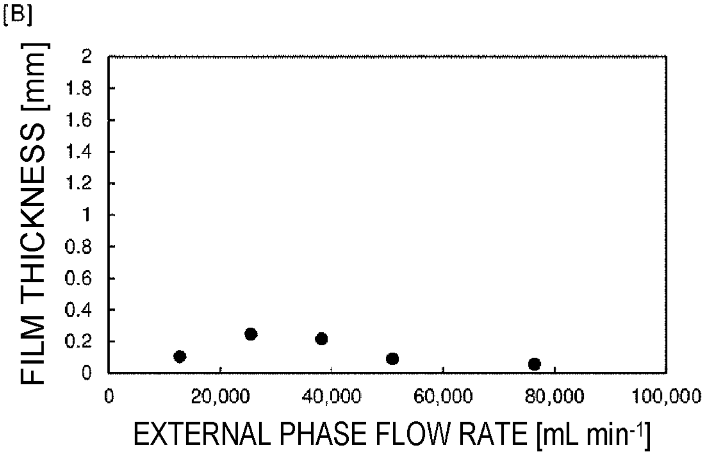

[Fig. 26]
[A]
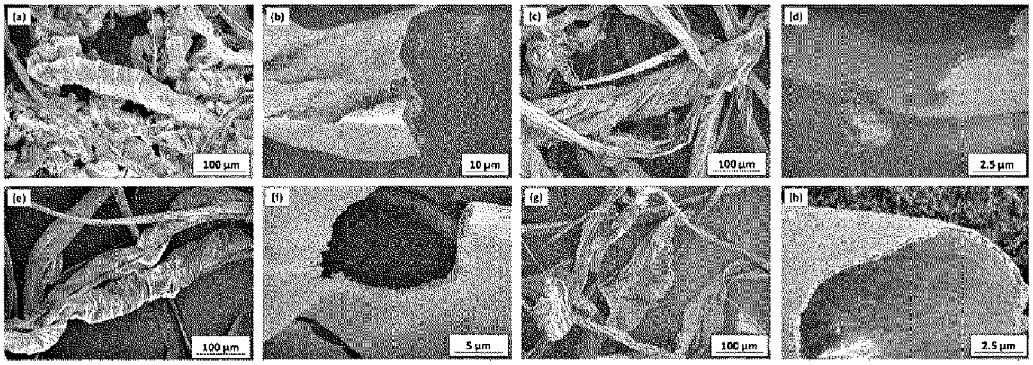
[B]
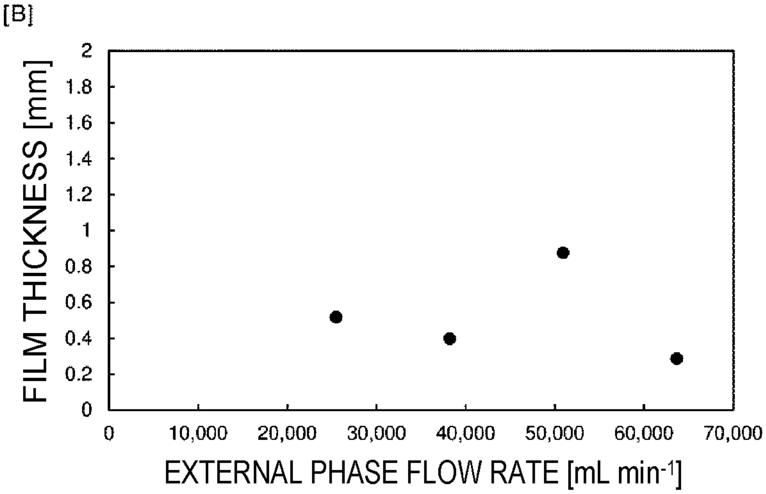

WET SPUN FIBERS, WET FORMED FILM, AND PRODUCTION METHOD THEREFOR

TECHNICAL FIELD

The present invention relates to fibers having a nano-sized fiber diameter (nanofibers) made of various polymer materials (polymers) and film-like molded articles having a nano-sized thickness (nanofilms), and wet production methods therefor. The present invention more specifically relates to a wet production method of nanofibers and a wet production method of a nanofilm, the nanofibers and the nanofilm having improved molecular orientation, by use of a double-walled pipe type micronozzle apparatus.

BACKGROUND ART

Various wet production methods (wet spinning methods) have been widely used so far for fibers formed of a polymer material having a fine nano-sized fiber diameter (nanofibers). In wet spinning methods, a polymer solution as the raw material is discharged through a nozzle into a coagulation bath in a stationary state to thereby provide polymer fibers. Generally, fibers having high strength are prepared by physically stretching fibers generated in the longitudinal axis direction by tensioning (pulling) the fibers to improve the orientation of the polymers.

For example, Patent Literature 1 describes biodegradable porous ultrafine hollow fibers mainly based on poly α-hydroxy acid (polylactic acid and the like) (inner diameter: 500 μm or less, outer diameter: for example, less than 1 mm) and a method for producing the hollow fibers by a wet double spinning method. The wet double spinning method in Patent Literature 1 employs a double wet spinning apparatus, equipped with a nozzle having an outer diameter of 1.0 mm and an inner diameter of 0.6 mm, capable of extruding two different solutions. Polylactic acid dissolved in dioxane is supplied to the outer diameter portion (sheath portion) of the nozzle, and methanol is supplied to the inner diameter portion (core portion) of the nozzle. The supplied liquids are extruded into a coagulation bath still in place and including dry ice and methanol. The material to be coagulated (the polylactic acid) in the sheath portion is frozen and then desolvated to thereby provide hollow fibers. Patent Literature 1 also describes that hollow yarn generated in the coagulation bath may be stretched as required by pulling the yarn faster than the extrusion rate in the above wet double spinning method.

As a wet spinning method by which stretched fine fibers can be provided with a simpler operation, as described in Patent Literature 2, a method has been conventionally known in which a raw spinning solution is extruded into a coagulation liquid for coagulation using a funneled production apparatus and a yarn-like article generated is stretched while being allowed to fall with the coagulation liquid toward the downstream (falling stretch spinning method). Several techniques to produce fibers in a shear flow also have been reported recently. For example, in Patent Literature 3, a technique is reported in which a polymer solution is continuously introduced into a dispersion medium (poor solvent for the polymer) in which a shear flow is occurring and polymer droplets generated therefrom are stretched to thereby provide nanofibers. Patent Literature 4 reports an approach of rotating a nozzle filled with a polymer solution and coagulating a jet flow discharged from the nozzle to provide fibers (Rotary jet spinning).

As wet spinning methods, a method for producing fibers made of polyester (polylactic acid or the like), cellulose or a derivative thereof or the like is well-known. Recently, methods for producing fibers made of a carbon material such as carbon nanotubes also have been suggested. For example, Patent Literature 5 discloses a method for producing a coagulation spinning structure including a step of injecting a dispersion liquid, obtained by dispersing carbon nanotubes in water only or a mixed solvent including an organic solvent and water (a first solvent) by means of a surfactant without use of a binder resin such as polyvinyl alcohol (PVA), into a coagulation liquid as a second solvent different from the first solvent and coagulation spinning the carbon nanotubes.

Meanwhile, as for a method for producing a film-like molded article having a nano-sized thickness (nanofilm) formed of a polymer material, common continuous film preparation methods have been commercialized, in which molding processing is made in a Roll-to-Roll manner by extruding a melt polymer or a mixed liquid obtained by adding a plasticizer to a polymer and stretching the extrudate. As a wet method for producing a nanofilm from a polymer solution, a combination method of a cast method and film forming by use of a spin coater may be carried out at a laboratory level. The cast method, which is a method of evaporating a solvent from a polymer solution to dryness, can rapidly evaporate the solvent to dryness by expanding the surface area while thinly spreading the solution via a centrifugal force using a spin coater. However, no wet methods for producing a nanofilm have been commercialized.

Patent Literature 6 describes a reaction spinning method in which a polyurethane prepolymer is discharged into a reaction bath including a reaction solution flowing in the same direction as the traveling direction of the polyurethane prepolymer, although the method is not wet spinning but reaction spinning, and a polyurethane urea (PUU) continuous molded article produced by the method. In conventional reaction spinning methods, the liquid resistance increases during drawing because the external phase is stationary, and it is difficult to raise the spinning speed. Thus, fine fibers cannot be produced due to problems such as cutting and economies. In the reaction spinning method described in Patent Literature 6, when a reaction solution to be the internal phase is discharged into a reaction bath to be the external phase, the speed of the external phase is made higher than that of the internal phase to lower the liquid resistance, and the spinning (drawing) speed can be enhanced. As one embodiment of the invention, in the description of Example 22, a polyurethane prepolymer was discharged from a rectangular nozzle (width: 0.16 mm) at a predetermined line speed, guided into a tubular path inner tube portion using a reaction solution having a predetermined flowing speed, molded into tape-like PUU, and collected. However, the shape and size such as thickness of the "tape-like" PUU thus provided in this manner are unknown. Patent Literature 6 describes that, with respect of the wet spinning method, "production of an elastic PUU fiber having a thickness larger than 10 deniers at an economical spinning is difficult because the rate of removing solvent from the polymer solution is slow", "Conversely, an elastic PUU fiber having a thickness smaller than 10 deniers, the demand of which is sharply increasing recently due to the recent tendency toward making the products lightweight, is also difficult because of the air resistance and solution resistance.", and the like.

Non-Patent Literature 1 describes that a hydrogel sheet in which cells and alginic acid fibers are arranged in a stripe pattern can be produced by, in a micro device comprising a plurality of rectangular microchannels running in parallel in the lateral direction, allowing a cell solution or an alginic acid solution to flow in each of the microchannels and discharging the solutions into a gelatinizing solution containing barium ions, and gelling the alginic acid solution therein.

The applicant previously disclosed, in Patent Literature 7, a method of continuously providing single chain nanofibers via a "micro wet spinning process", in which wet spinning is carried out by extruding an internal phase including an oil-soluble low block copolymer (having hydrophobic segments derived from an aliphatic polyester resin such as polylactic acid and a hydrophilic segments derived from a hydrophilic polymer such as PEG) and an organic solvent into an external phase including a surfactant and water of which flow speed is controlled high, using a double-walled pipe type micronozzle apparatus equipped with micro flow channels having an orifice shape (apparatus modified to be adapted for production of a fiber diameter thinner than that produced by the double wet spinning apparatus described in Patent Literature 1). Patent Literature 8 discloses a method for producing cellulose nanofibers, comprising a step of extruding an internal phase including cellulose and an ionic liquid (ionic liquid solution of the cellulose) into an external phase including water, also using a double-walled pipe type micronozzle apparatus. However, Patent Literature 7 does not specifically describe application to copolymers other than the special copolymer described above, and Patent Literature 8 does not specifically describe use of a good solvent for cellulose other than the special solvent described above. Moreover, neither Patent Literature 7 nor 8 describes that the step of extruding an internal phase into an external phase singly can improve the molecular orientation. Furthermore, neither Patent Literature 7 nor 8 describes providing not nanofibers but a nanofilm (film-like molded article).

CITATION LIST

Patent Literature

Patent Literature 1: JP 2003-328229 A
Patent Literature 2: JP S60-246806 A
Patent Literature 3: US 2010/0247908 A1 (U.S. Pat. No. 8,551,378 B2)
Patent Literature 4: US 2015/0354094 A1
Patent Literature 5: JP 2012-126635 A
Patent Literature 6: WO1998/038364 (JP 3791932 B)
Patent Literature 7: WO2012/029710A1 (JP 5835743 B)
Patent Literature 8: JP 2015-004151 A (JP 6229927 B)

Non-Patent Literature

Non-Patent Literature 1: Kobayashi et al., J. BIOSCI. BIOENG., 116(6), 761-767, 2013

SUMMARY OF INVENTION

Technical Problem

In a conventional common wet spinning method, a spinning step of processing a polymer into a fibrous form and a polymer stretching step of improving the strength of the fibers are separate processes. Thus, such processes are complicated and require a significant capital investment for industrial use. In addition, none of the literatures cited above has reported that fibers having improved molecular orientation can be obtained by a falling stretch spinning method or a production method of preparing fine polymer fibers in a shear flow field. If preparation and improvement in orientation of polymer fibers can be achieved in a one-stage process, conventional processes can be significantly simplified. The molecular orientation is considered to affect the physical properties and functions of fibers provided, and thus improvement in the molecular orientation is extremely important in development of high-performance fibers. So far, stretching steps including a large amount of know-how introduced have been developed to lead to development of fiber products having controlled molecular orientation. As fibers become finer like nanofibers, the tensile strength per fiber is extremely lowered, and thus, it is also extremely difficult to perform a stretching step after spinning.

Meanwhile, in a roll-to roll process, which has been commercialized for film-like molded articles, thin films are prepared over time by extrusion after kneading and a stretching step. In any of conventional techniques, film molding processing requires a large apparatus and power, and the processing is performed during a period of seconds to minutes. In a laboratory-level method in which a cast method is combined with film forming by use of a spin coater, it is difficult to make films thinner only with the cast method. Although use of a spin coater can achieve film thinning, continuous production may not be performed.

In one aspect, it is an object of the present invention to provide a method for producing wet spun fibers, the method being capable of continuously providing fibers having a fine (preferably nano-sized) cross-sectional diameter and having improved molecular orientation at a high speed in a simple wet step.

Additionally, in one aspect, it is another object of the present invention to provide a method for producing a wet formed film, the method being capable of continuously providing a film(s) having an extremely thin (preferably nano-sized) thickness at a high speed in a simple wet step.

Solution to Problem

The present inventors have performed spinning using an internal phase prepared by dissolving various fiber materials in a good solvent and an external phase including a poor solvent for the fiber materials while variously changing the ratio of the external phase flow rate to the internal phase flow rate (referred to herein as the "flow rate ratio") in the wet spinning method (micro wet spinning process) by use of a double-walled pipe type micronozzle apparatus described in Patent Literatures 7 and 8 listed above. As a result, the present inventors have found that controlling the line speed of the external phase and the flow rate ratio of the internal phase and the external phase in the spinning step enables fibers that are fine and have high molecular orientation to be provided without need of stretching processing and the like, which conventionally have been performed as a separate step and that thereby, also with respect to fibers of which molecular orientation has been conventionally difficult to improve with stretching processing and the like (in, e.g., an electrospinning (electric field spinning) method and the like), fibers having improved molecular orientation can be produced. It is considered that the poor solvent to precipitate the fiber material dissolved in the internal phase for fiber formation is not stationary as a coagulation bath but flowing as the external phase along with the internal phase and these two fluids will have a high line speed in the orifice portion of the double-walled pipe type micronozzle apparatus and that the above fibers that are fine and have high molecular orientation (nanofibers) are provided because of the shear flow of the fluids.

The present inventors have also found that, in a method for producing nanofibers as described above, a film (fibers in a film form) can be produced from a dilute polymer solution in an extremely short period by changing the shape of the orifice of the micronozzle (cross-sectional structure of the double-walled pipe portion) from circular to rectangular and that, via a stretching effect due to the solution flow of the internal phase and the external phase in the process, a uniaxially stretched film having a high aspect ratio (width/thickness) can be continuously prepared at a millisecond level and collected in the solution, having completed the present invention.

That is, the present invention encompasses the following.

[1]

A method for producing wet spun fibers using a double-walled pipe type micronozzle apparatus, wherein in a step of extruding an internal phase comprising a fiber material and a good solvent for the fiber material in a linear form from a circular end of an internal pipe of the apparatus into an external phase comprising a poor solvent for the fiber material, the external phase flowing in an external pipe of the apparatus, an external phase line speed at an orifice portion at which the internal phase and the external phase merge is 0.1 $ms^{-1}$ or more, and a ratio of a flow rate of the external phase to a flow rate of the internal phase is 1 or more.

[2]

The method for producing wet spun fibers according to item 1, wherein the internal phase comprises a polyamide resin, a polyester resin, cellulose or a derivative thereof, a vinyl resin, or a carbon material as the fiber material.

[3]

The method for producing wet spun fibers according to item 2, wherein the fiber material is a polyamide resin, the external phase line speed is 0.1 $ms^{-1}$ or more, and the ratio of the flow rate of the external phase to the flow rate of the internal phase is 10 or more.

[4]

The method for producing wet spun fibers according to item 2, wherein the fiber material is a polyester resin, the external phase line speed is 0.1 $ms^{-1}$ or more, and the ratio of the flow rate of the external phase to the flow rate of the internal phase is 10 or more.

[5]

The method for producing wet spun fibers according to item 2, wherein the fiber material is cellulose or a derivative thereof, the external phase line speed is 0.1 $ms^{-1}$ or more, and the ratio of the flow rate of the external phase to the flow rate of the internal phase is 10 or more.

[6]

The method for producing wet spun fibers according to item 2, wherein the fiber material is a vinyl resin, the external phase line speed is 0.1 $ms^{-1}$ or more, and the ratio of the flow rate of the external phase to the flow rate of the internal phase is 10 or more.

[7]

The method for producing wet spun fibers according to item 2, wherein the fiber material is a carbon material, the external phase line speed is 0.1 $ms^{-1}$ or more, and the ratio of the flow rate of the external phase to the flow rate of the internal phase is 10 or more.

[8]

Wet spun fibers, provided by a method for producing wet spun fibers using a double-walled pipe type micronozzle apparatus, and formed of a material that can be formed into fibers in the production method, wherein the wet spun fibers have a fiber diameter of 1,000 μm or less and a birefringence index of 0.0001 or more.

[9]

The wet spun fibers according to item 8, wherein the fiber material comprises a polyamide resin, a polyester resin, cellulose or a derivative thereof, a vinyl resin, or a carbon material.

[10]

The wet spun fibers according to item 9, wherein the fiber material is a polyamide resin, the fiber diameter is 50 μm or less, and the birefringence index is 0.001 or more.

[11]

The wet spun fibers according to item 9, wherein the fiber material is a polyester resin, the fiber diameter is 100 μm or less, and the birefringence index is 0.001 or more.

[12]

The wet spun fibers according to item 9, wherein the fiber material is cellulose or a derivative thereof, the fiber diameter is 50 μm or less, and the birefringence index is 0.001 or more.

[13]

The wet spun fibers according to item 9, wherein the fiber material is a vinyl resin, the fiber diameter is 100 μm or less, and the birefringence index is 0.001 or more.

[14]

The wet spun fibers according to item 9, wherein the fiber material is a carbon material, the fiber diameter is 50 μm or less, and the birefringence index is 0.001 or more.

[15]

A method for producing a wet formed film using a double-walled pipe type micronozzle apparatus, wherein in a step of extruding an internal phase comprising a film material and a good solvent for the film material in a sheet form from a rectangular end of an internal pipe of the apparatus into an external phase comprising a poor solvent for the film material, the external phase flowing in an external pipe of the apparatus, a ratio of a flow rate of the external phase to a flow rate of the internal phase is 1 or more.

[16]

The method for producing a wet formed film according to item 15, wherein an external phase line speed at an orifice portion at which the internal phase and the external phase merge is 10 $ms^{-1}$ or more.

[17]

The method for producing a wet formed film according to item 15, wherein the internal phase comprises a polyester resin or a vinyl resin as the film material.

[18]

The method for producing a wet formed film according to item 15, wherein the film material is a polyester resin, and the ratio of the flow rate of the external phase to the flow rate of the internal phase is 1 or more.

[19]

The method for producing a wet formed film according to item 15, wherein the film material is a vinyl resin, and the ratio of the flow rate of the external phase to the flow rate of the internal phase is 1 or more.

[20]

A wet formed film, provided by a method for producing a wet formed film using a double-walled pipe type micronozzle apparatus, and formed of a material that can be formed into a film in the production method, wherein the wet formed film has a film thickness of 1,000 μm or less.

[21]

The wet formed film according to item 20, wherein the film material comprises a polyester resin or a vinyl resin.

Advantageous Effect of Invention

In conventional techniques, there is no case in which molecular orientation is improved by a fluid flow (shear flow) during spinning. The method for producing wet spun fibers according to the present invention is not only useful as a method of preparing fine fibers having improved molecular orientation (e.g., two times or more that of conventional ones) in one stage but also expected to provide fine fibers having improved mechanical strength and performance as fibers in association with the improved molecular orientation. Particularly, with respect to nano-scale fine fibers (nanofibers) for which a stretching step is difficult to introduce, the present invention has high superiority as a production technique enabling functions of fibers to be improved.

In addition, when the shape of the nozzle is changed, a film having a nano-sized thickness can be prepared in a wet manner as in the case of nanofibers, without use of a large stretching apparatus. It is possible to prepare an anisotropic film uniaxially stretched (scarcely stretched in the short direction and stretched in the longitudinal direction at a desired degree of stretching) by the flow of the external phase during film preparation. A product having an internal structure in which the evaporation surface is asymmetric to the other surface is provided by evaporation to dryness in a conventional wet production method of a nanofilm, whereas, in the production method of the present invention, the good solvent for the polymer of the internal phase is diffused from both the surfaces in the poor solvent of the external phase for coagulation, and thus, an internal structure having a symmetry can be produced. The aspect ratio, thickness, and degree of stretching of the film can be controlled in an identical production device by the flow rate ratio of the internal phase and the external phase, preferably further by the external phase line speed.

BRIEF DESCRIPTION OF DRAWINGS

FIG. 1 illustrates a schematic view and the like according to an embodiment of production of wet spun fibers in the present invention. [A] A schematic view illustrating preparation of wet spun fibers made of a polymer material by use of a double-walled pipe micronozzle apparatus. [B] A schematic view illustrating the internal structure (periphery of an orifice portion) of the double-walled pipe micronozzle apparatus. a is an internal pipe diameter, b is an orifice diameter, c is a piping diameter, and d is an orifice length. The numeric value exemplified for each of these is a value for the double-walled pipe micronozzle apparatus for wet spinning used in Examples. [C] A schematic view illustrating a cross section (S-S' in [B]) at the discharge portion of the double-walled pipe micronozzle.

FIG. 2 relates to Example 1, in which polyamic acid fibers were produced (see Table 2). [A] A scanning electron microscope (SEM) image of Sample 1-10. [B] A plot representing the relationship between the flow rate ratio of the external phase and the internal phase (horizontal axis), with the fiber diameter (right vertical axis, •, the same applies to other figures), and with the birefringence index (left vertical axis, ■, the same applies to other figures).

FIG. 3 relates to Example 2, in which PET fibers were produced (see Table 3). [A] An SEM image of Sample 2-4. [B] A plot representing the relationship of the flow rate ratio of the external phase and the internal phase (horizontal axis) with the fiber diameter (right vertical axis), and with the birefringence index (left vertical axis).

FIG. 4 relates to Example 3, in which cellulose acetate fibers were produced (see Table 4). [A] An SEM image of Sample 3-3. [B] A plot representing the relationship of the flow rate ratio of the external phase and the internal phase (horizontal axis) with the fiber diameter (right vertical axis), and with the birefringence index (left vertical axis).

FIG. 5 relates to Example 4, in which PLA fibers (No. 1) were produced (see Table 5). [A] An SEM image of Sample 4-7. [B] A plot representing the relationship of the flow rate ratio of the external phase and the internal phase (horizontal axis) with the fiber diameter (right vertical axis), and with the birefringence index (left vertical axis).

FIG. 6 is a plot representing the relationship of the flow rate ratio of the external phase and the internal phase (horizontal axis) with the fiber diameter (right vertical axis), and with the birefringence index (left vertical axis), in Example 5, in which PLA fibers (No. 2) were produced (See Table 6).

FIG. 7 is a plot representing the relationship of the flow rate ratio of the external phase and the internal phase (horizontal axis) with the fiber diameter (right vertical axis), and with the birefringence index (left vertical axis), in Example 6, in which PS fibers (No. 1) were produced (see Table 7).

FIG. 8 is a plot representing the relationship of the flow rate ratio of the external phase and the internal phase (horizontal axis) with the fiber diameter (right vertical axis), and with the birefringence index (left vertical axis), in Example 7, in which PS fibers (No. 2) were produced (See Table 8).

FIG. 9 is a plot representing the relationship of the flow rate ratio of the external phase and the internal phase (horizontal axis) with the fiber diameter (right vertical axis), and with the birefringence index (left vertical axis), in Example 8, in which PVA fibers were produced (see Table 9).

FIG. 10 is a plot representing the relationship of the flow rate ratio of the external phase and the internal phase (horizontal axis) with the fiber diameter (right vertical axis), and with the birefringence index (left vertical axis), in Example 9, in which CNT fibers (No. 1) were produced (see Table 10).

FIG. 11 is a plot representing the relationship of the flow rate ratio of the external phase and the internal phase (horizontal axis) with the fiber diameter (right vertical axis), and with the birefringence index (left vertical axis), in Example 10, in which CNT fibers (No. 2) were produced (See Table 11).

FIG. 12 shows [A] a plot representing the relationship of the winding speed (horizontal axis) with the fiber diameter (right vertical axis), and with Ih/Iv (left vertical axis), and [B] a plot representing the relationship of the winding speed (horizontal axis) with the fiber diameter (right vertical axis), and with the stress (left vertical axis), in Example 11, in which CNT fibers (No. 3) were produced.

FIG. 13 is a plot representing the relationship of the flow rate ratio of the external phase and the internal phase (horizontal axis) with the fiber diameter (right vertical axis), and with Ih/Iv (left vertical axis) in Example 12, in which CNT fibers (No. 4) were produced (see Table 12).

FIG. 14 is a plot representing the relationship of the flow rate ratio of the external phase and the internal phase (horizontal axis) with the fiber diameter (right vertical axis), and with Ih/Iv (left vertical axis) in Example 13, in which CNT fibers (No. 5) were produced (see Table 13).

FIG. 15 shows [A] a plot representing the relationship of the winding speed (horizontal axis) with the fiber diameter (right vertical axis), and with Ih/Iv (left vertical axis), and [B] a plot representing the relationship of the winding speed (horizontal axis) with the fiber diameter (right vertical axis), and with the stress (left vertical axis), in Example 14, in which CNT fibers (No. 6) were produced.

FIG. 16 is a plot representing the relationship of the flow rate ratio of the external phase and the internal phase (horizontal axis) with the fiber diameter (right vertical axis), and with the birefringence index (left vertical axis), in Example 15, in which PBLG fibers (No. 1) were produced (See Table 14).

FIG. 17 is a plot representing the relationship of the flow rate ratio of the external phase and the internal phase (horizontal axis) with the fiber diameter (right vertical axis), and with the birefringence index (left vertical axis), in Example 16, in which PBLG fibers (No. 2) were produced (See Table 15).

FIG. 18 is a plot representing the relationship of the flow rate ratio of the external phase and the internal phase (horizontal axis) with the fiber diameter (right vertical axis), and with the birefringence index (left vertical axis), in Example 17, in which PBLG fibers (No. 3) were produced (See Table 16).

FIG. 19 is a plot representing the relationship of the flow rate ratio of the external phase and the internal phase (horizontal axis) with the fiber diameter (right vertical axis), and with the birefringence index (left vertical axis), in Example 18, in which PBLG fibers (No. 4) were produced (See Table 17).

FIG. 20 represents a schematic view and the like according to an embodiment of production of a wet formed film in the present invention. [A] A schematic view illustrating a double-walled pipe micronozzle apparatus for production of a wet formed film made of a polymer material. [B] A schematic view illustrating the internal structure (periphery of an orifice portion) of the double-walled pipe micronozzle apparatus. In a cross-sectional view as viewed from in the side (1) direction (longitudinal sectional view), A is an internal pipe discharge port minor diameter, B is an external pipe discharge port minor diameter, and C is an orifice minor diameter. In a cross-sectional view as viewed from in the side (2) direction (transverse sectional view), D is an internal pipe discharge port major diameter, E is an external pipe discharge port major diameter, F is an orifice major diameter, G is an orifice length, and H is a piping diameter. The numeric value exemplified for each of these is a value for the double-walled pipe micronozzle apparatus for a wet film formation used in the Examples.

FIG. 21 relates to Samples 17-1 to 17-5 of Example 19, in which a PS film was produced (see Table 18). [A] An SEM image. The internal phase flow rate is 110 μL/min for all the samples, and the external phase flow rate is 12,730 μL/min for (a) and (b), 25,470 μL/min for (c) and (d), 38,200 μL/min for (e) and (f), 50,930 μL/min for (g) and (h), and 63,660 μL/min for (i) and (j). [B] A plot representing a relationship between the external phase flow rate and the film thickness.

FIG. 22 relates to Samples 17-8 to 17-11 of Example 19, in which a PS film was produced (see Table 18). [A] An SEM image. The internal phase flow rate is 55 μL/min for all the samples, and the external phase flow rate is 19,100 μL/min for (a) and (b), 25,470 μL/min for (c) and (d), 31,830 μL/min for (e) and (f), and 38,200 μL/min for (g) and (h). [B] A plot representing a relationship between the external phase flow rate and the film thickness.

FIG. 23 is an SEM image of Sample 18-1 in Example 20, in which a PDLLA film was produced (see Table 19).

FIG. 24 is an SEM image of Sample 18-2 in Example 20, in which a PDLLA film was produced (see Table 19).

FIG. 25 relates to Samples 18-3 to 18-7 of Example 20, in which a PDLLA film was produced (see Table 19). [A] An SEM image. The internal phase flow rate is 110 μL/min for all the samples, and the external phase flow rate is 12,730 μL/min for (a) and (b), 25,470 μL/min for (c) and (d), 38,200 μL/min for (e) and (f), 50,930 μL/min for (g) and (h), and 76,390 μL/min for (i) and (j). [B] A plot representing a relationship between the external phase flow rate and the film thickness.

FIG. 26 relates to Samples 19-1 to 19-5 of Example 21, in which a PVA film was produced (see Table 20). [A] An SEM image. The internal phase flow rate is 57 μL/min for all the samples, and the external phase flow rate is 25,470 μL/min for (a) and (b), 38,200 μL/min for (c) and (d), 50,930 μL/min for (e) and (f), and 63,660 μL/min for (g) and (h). [B] A plot representing a relationship between the external phase flow rate and the film thickness.

DESCRIPTION OF EMBODIMENTS

In the present description, the wet spun fibers and wet formed film provided by the production method of the present invention, in typical embodiments, have a nano-sized fiber diameter and a nano-sized film thickness, respectively. Thus, the fibers and the film may be referred to as the "nanofibers" and "nanofilm", respectively, for convenience. The wet spun fibers and wet formed film provided by the production method of the present invention, however, are not limited to fibers having a nano-sized fiber diameter and films having a nano-sized thickness. Regardless of whether the fiber diameter and the film thickness are nano-sized or not, the wet spun fibers and wet formed film provided by the production method of the present invention are referred to as the "wet spun fibers of the present invention" and the "wet formed film of the present invention", respectively.

—Methods for Producing Wet Spun Fibers and Wet Formed Film—

A method for producing wet spun fibers of the present invention is performed using a double-walled pipe type micronozzle apparatus. In a step of extruding an internal phase comprising a fiber material and a good solvent for the fiber material in a linear form from the circular end of the internal pipe of the apparatus into an external phase comprising a poor solvent for the fiber material, the external phase flowing in the external pipe of the apparatus (extrusion step described below), at the orifice portion at which the internal phase and the external phase merge, the external phase line speed is set to a predetermined speed or higher, and the ratio of the flow rate of the external phase to the flow rate of the internal phase (external phase flow rate/internal phase flow rate. herein referred to as the "flow rate ratio") is set to a predetermined value or more.

A method for producing a wet formed film of the present invention is performed using a double-walled pipe type micronozzle apparatus. In a step of extruding an internal phase comprising a film material and a good solvent for the film material in a sheet form from the rectangular end of the internal pipe of the apparatus into an external phase comprising a poor solvent for the film material (extrusion step), at the orifice portion at which the internal phase and the external phase merge, the ratio of the flow rate of the external phase to the flow rate of the internal phase (flow rate ratio) is set to a predetermined value or more, and preferably, the external phase line speed is further set to a predetermined speed or higher.

<Double-Walled Pipe Type Micronozzle Apparatus>

The "double-walled pipe type micronozzle apparatus" for use in the method for producing wet spun fibers of the present invention has a basic structure common to that of the double-walled pipe type micronozzle apparatus used in the invention described in Patent Literatures 7 and 8 listed above. An exemplary basic structure of the double-walled pipe micronozzle apparatus for production of wet spun fibers is schematically illustrated in FIG. 1 ([A], [B], and [C]). The double-walled pipe micronozzle apparatus comprises a double-walled pipe micro flow channel composed of an internal pipe (a micro flow channel for allowing the internal phase to flow therein) and an external pipe (a micro flow channel for allowing the external phase to flow therein), and a liquid supply device (e.g., syringe pump) connected to each of the pipes (micro flow channels) enables the internal phase and the external phase to be supplied at a desired flow rate. One end (discharge port) of each of the internal pipe and the external pipe is nozzle-shaped (micronozzle), and the internal phase and the external phase are each extruded (discharged) therefrom. In the double-walled pipe type micronozzle apparatus for use in producing wet spun fibers, the discharge port of the internal pipe is circular as that described in Patent Literatures 7 and 8 listed above, and the internal phase is extruded in a linear form. The discharge port of the external pipe is also circular so as to surround the internal pipe, and the internal pipe and the external pipe are nested circularly (concentric) at the discharge portion. The internal phase extruded out of the internal pipe and the external phase extruded out of the external pipe merge at the orifice portion (opening). In the present invention, adjusting the external phase line speed at the orifice portion in accordance with the flow rate of each of the internal phase and the external phase enables fibers having a desired fiber diameter and birefringence index (orientation) to be formed from the fiber material included in the internal phase.

The internal pipe diameter (a), orifice diameter (b), piping diameter (c), and orifice length (d) shown around the orifice portion of the double-walled pipe type micronozzle apparatus, in which the discharge port of the internal pipe is circular, in FIG. 1[B], are elements relevant to the internal phase line speed and the external phase line speed at the orifice, along with the flow rate ratio of the internal phase and the external phase. The size of each element can be designed as appropriate such that wet spun fibers having a desired fiber diameter and polymer orientation can be provided, that is, a desired external phase line speed can be achieved when the internal phase and the external phase are supplied at a desired flow rate ratio, and the size is not particularly limited. For example, the internal pipe diameter (a) may be 50 μm to 5,000 μm (5 mm), the orifice diameter (b) may be 100 μm to 2,000 μm (2 mm), the piping diameter (c) may be 500 μm to 100,000 μm (100 mm), and the orifice length (d) may be 1 μm to 100,000 μm (100 mm). The term "circular" generally means truly circular or substantially truly circular, where a tolerance in manufacturing (e.g., 5% with respect to the diameter) may be acceptable. Additionally, as long as wet spun fibers that induce operational effects of the present invention can be provided, deformed circles also may be acceptable, such as an ellipse having a slight difference between the major diameter and the minor diameter (e.g., the major diameter is within the minor diameter+10%).

An exemplary basic structure of the double-walled pipe type micronozzle apparatus for use in the method for producing a wet formed film of the present invention is schematically illustrated in FIG. 20 ([A] and [B]). The basic structure of the double-walled pipe type micronozzle apparatus for production of a wet formed film is common to that of the double-walled pipe type micronozzle apparatus for production of wet spun fibers, but the shape of the internal pipe and the external pipe at the discharge port and the structure around the orifice portion are different. In the apparatus for a wet formed film production, the discharge port of the internal pipe is rectangular, and the internal phase is extruded into a sheet form. The discharge port of the external pipe is also rectangular so as to surround the internal pipe, and the internal pipe and the external pipe are nested rectangularly in a discharged article. The term "rectangular" means, as long as a wet formed film that induces operational effects of the present invention can be provided, rectangles having desired major sides and minor sides (aspect ratio), and deformed rectangles, such as ones having rounded corners, are also acceptable.

The internal pipe discharge port minor diameter (A), external pipe discharge port minor diameter (B), orifice minor diameter (C), internal pipe discharge port major diameter (D), external pipe discharge port major diameter (E), orifice major diameter (F), orifice length (G), and piping diameter (H), illustrated around the orifice portion of the double-walled pipe type micronozzle apparatus having a rectangular internal pipe in FIG. 20[B], are elements relevant to the internal phase line speed and the external phase line speed at the orifice, along with the flow rate ratio of the internal phase and the external phase. The size of each element can be designed as appropriate such that a wet formed film having a desired film thickness, aspect ratio, and preferably further a degree of stretching can be provided, that is, preferably a desired external phase line speed can be achieved when the internal phase and the external phase are supplied at a desired flow rate ratio, and the size is not particularly limited.

For example, the internal pipe discharge port minor diameter (A) may be 30 to 5,000 μm, the internal pipe discharge port major diameter (D) may be 300 to 50,000 μm, the aspect ratio (D/A) may be 10 or more, the external pipe discharge port minor diameter (B) may be 50 to 10,000 μm, the external pipe discharge port major diameter (E) may be 500 to 100,000 μm, the aspect ratio (E/B) may be 10 or more, the orifice minor diameter (C) may be 30 to 5,000 μm, the orifice major diameter (F) may be 300 to 50,000 μm, the aspect ratio (F/C) may be 10 or more, the orifice length (G) may be 500 to 10,000 μm, and the piping diameter (H) may be 500 to 100,000 μm.

The numeric values of the minor diameter and major diameter of the external pipe discharge port does not exclude the length of the minor diameter and major diameter of the nested internal pipe discharge port. To determine the minor diameter and major diameter of the discharge port for "only the external pipe" (cross sectional area), it is only required that the minor diameter and major diameter (cross sectional area) of the "internal pipe discharge port" be subtracted from the minor diameter and major diameter (cross sectional area)

of the "external pipe discharge port" (and the cross sectional area of the member forming the frame of the internal pipe discharge port be further subtracted as required).

<Internal Phase and External Phase>

In the present invention, a solution including a material to form fibers or a film to be produced (referred to as a "fiber/film material" herein) by the production method of the present invention, that is, a solution including a fiber/film material and a good solvent for the fiber/film material is supplied, as the internal phase, into the internal pipe of the double-walled pipe type micronozzle. Meanwhile, a poor solvent for the fiber/film material or a solution including a poor solvent is supplied, as the external phase, into the external pipe of the double-walled pipe type micronozzle. The "fiber/film material" may be read as the "fiber material and film material" or the "fiber material or film material", as required.

Fiber/Film Material

The fiber/film material is not particularly limited as long as the fiber/film material can be formed into fibers or a film by a wet production method using the double-walled pipe type micronozzle apparatus. Such a fiber/film material may be selected from ones used as materials for use in known fiber or film wet production methods, and examples thereof include polyamide, polyester, cellulose or a derivative thereof, a vinyl resin, and a carbon material. Preferred film materials among these are polyester and a vinyl resin. One of these fiber/film materials may be used singly or two or more of these may be used in mixture.

A "polyamide resin" in the present invention generally refers to a polymer (artificially synthesized resin) having a structure in which one or two or more monomers are bonded with one another via an amide bond. For example, artificially synthesized resins such as nylon having an aliphatic skeleton, aramid having an aromatic skeleton, and further, a polyamide acid (polyamic acid), which is a precursor of polyimide, are typical polyamide resins. Among polyamide resins, examples of typical nylons include nylon 6, nylon 11, nylon 12, nylon 66, nylon 610, nylon 6T, nylon 6I, nylon 9T, nylon MST, and nylon 612. Examples of typical aramids include poly-p-phenylene terephthalamide (registered trademark: "Kevlar", registered trademark: "Twaron") and poly-m-phenylene isophthalamide (registered trademark: "Nomex"). Example of typical polyamic acids include a copolymer of pyromellitic dianhydride and 4,4'-diaminodiphenyl ether, which corresponds to an intermediate for synthesizing "Kapton H", which is a polyimide of Dupont Inc., in a two-stage process. Polyamic acid is a generic term for various compounds corresponding to precursors of each polyimide synthesized from various tetracarboxylic dianhydrides and diamines. Aramid having an aromatic skeleton such as poly-p-phenylene terephthalamide is also known as a liquid crystal polymer, and sulfuric acid can be used as a good solvent therefor in the present invention.

The polyamide resin in the present invention is not limited to those exemplified above, and various polymers understood by those skilled in the art to correspond to the polyamide resin may be used. The "polyamide resin" encompasses not only polyamide resins in a narrow sense, in which all the bonds in the molecules are amide bonds, but also polyamide resins in a broad sense, in which the bonds in the molecules are mainly composed of amide bonds (the proportion of the amide bonds is the highest of all the types of bonds), but bonds other than the amide bonds are also included, that is, polyamide-based copolymers. The polyamide resin in a narrow sense may be a homopolymer or random copolymer composed via amide bonds between specific polymers or may be a block copolymer composed of blocks formed via amide bonds between specific polymers and blocks formed via amide bonds between polymers other than the specific polymers. An example of the polyamide resin in a broad sense (polyamide-based copolymer) is a block copolymer composed of blocks corresponding to the polyamide in a narrow sense described above and blocks corresponding to a polyester resin and/or vinyl resin in a narrow sense, described separately herein. Alternatively, a copolymer in which one monomer has three or more functional groups and a crosslinked structure is formed via two or more types of bonds mainly composed of amide bonds (some bonds form the backbone and other bonds form a crosslink in a side chain) is also included in the polyamide resin in a broad sense (polyamide-based copolymer).

Polyamino acids known as liquid crystal polymers, for example, polyglutamic acids such as poly(γ-benzyl-L-glutamic acid) (PBLG) and poly(γ-methyl-L-glutamic acid); polyaspartic acid; and ε-polylysine are also included in the polyamide resins of the present invention. Such polyamino acids may be polyamino acids formed only of L-forms, polyamino acids formed only of D-forms, and polyamino acids formed of DL-forms.

A "polyester resin" in the present invention generally refers to a polymer (artificially synthesized resin) having a structure in which one or two or more monomers are bonded with one another via an ester bond. Typical examples of the polyester resin can include synthetic resins (polyester resins) such as polyethylene terephthalate (PET), polyethylene naphthalate (PEN), polytrimethylene terephthalate (PTT), polybutylene terephthalate (PBT), polybutylene naphthalate (PBN), polylactic acid (PLA), polyglycolic acid, polycaproic acid, polyhydroxybutyric acid, polybutylene succinate, and polyhydroxyalkanoates. However, the polyester resin in the present invention is not limited to these, and various polymers understood by those skilled in the art to correspond to the polyester resin may be used. The "polyester resin" encompasses not only polyester resins in a narrow sense, in which all the bonds in the molecules are ester bonds, but also polyester resins in a broad sense, in which the bonds in the molecules are mainly composed of ester bonds (the proportion of the ester bonds is the highest of all the types of bonds), but bonds other than the ester bonds are also included, that is, polyester-based copolymers. The polyester in a narrow sense may be a homopolymer or random copolymer composed via ester bonds between specific polymers or may be a block copolymer composed of blocks formed via ester bonds between specific polymers and blocks formed via ester bonds between polymers other than the specific polymers. An example of the polyester resin in a broad sense (polyester-based copolymer) is a block copolymer composed of blocks corresponding to the polyester in a narrow sense described above and blocks corresponding to a polyamide resin and/or vinyl resin in a narrow sense, described separately herein. Alternatively, a copolymer in which one monomer has three or more functional groups and a crosslinked structure is formed via two or more types of bonds mainly composed of ester bonds (some bonds form the backbone and other bonds form a crosslink in a side chain) is also included in the polyester resin in a broad sense (polyester-based copolymer).

The "cellulose or a derivative thereof" in the present invention encompasses cellulose, which is a natural polymer of a main component of plant fibers and the like or a semisynthetic polymer provided by subjecting cellulose, as a raw material, to a chemical treatment. Typical examples of the cellulose derivative include cellulose acetate, cellulose propionate, cellulose nitrate, ethyl cellulose, and carboxy methyl cellulose, but the cellulose derivatives in the present invention are not limited thereto. Various polymers understood by those skilled in the art to correspond to cellulose or a derivative thereof may be used.

A "vinyl resin" in the present invention generally refers to a polymer having a structure in which one or two or more monomers (vinyl compounds) are bonded with one another via addition polymerization between vinyl groups. Typical examples of the vinyl resin include polyethylene, polyvinyl chloride, polvinylidene chloride, polyvinyl acetate, polyvinyl alcohol, polyvinyl acetal, and polystyrene. The vinyl resin also encompasses, in addition to polystyrene, which is a homopolymer including styrene as the monomer (a styrene resin in a narrow sense), copolymers of styrene and another vinyl compound (styrene (-based) resins in a broad sense). Examples of the styrene-based resin other than polystyrene include a styrene-based thermoplastic elastomer (TPS), which is a block copolymer comprising polystyrene as hard segment and polybutadiene or polyisoprene as soft segment; an AS resin (SAN), which is a copolymer of styrene and acrylonitrile; and an ABS resin, which is a copolymer of acrylonitrile, butadiene, and styrene. As described above, the "vinyl resin" encompasses not only vinyl resins in a narrow sense, in which all the bonds in the molecules are formed via addition polymerization between vinyl groups, but also vinyl resins in a broad sense, in which the bonds in the molecules are mainly composed of via addition polymerization between vinyl groups (the proportion of the bonds formed via addition polymerization between vinyl groups is the highest of all the types of bonds), but other bonds are also included, that is, vinyl-based copolymers. The vinyl resin in a narrow sense may be a homopolymer or random copolymer composed via addition polymerization between vinyl groups of specific polymers or may be a block copolymer composed of blocks formed via addition polymerization between vinyl groups of specific polymers and blocks formed via addition polymerization between vinyl groups of polymers other than the specific polymers. An example of the vinyl resin in a broad sense (vinyl-based copolymer) is a block copolymer composed of blocks corresponding to the vinyl resin in a narrow sense described above and blocks corresponding to a polyamide and/or polyester in a narrow sense, described separately herein. Alternatively, a copolymer in which one monomer has three or more functional groups and a crosslinked structure is formed via two or more types of bonds mainly composed of addition polymerization between vinyl groups (some bonds form the backbone and other bonds form a crosslink in a side chain) is also included in the vinyl resin in a broad sense (vinyl-based copolymer).

A "carbon material" in the present invention refers to a material (compound) mainly composed of carbon atoms such as carbon nanotubes (CNTs), graphene, fullerenes, and derivatives thereof, in addition to so-called carbon fibers. In the present invention, any carbon material can be used as long as the material can be used as a fiber material, that is, can be formed into fibers by the production method of the present invention, and the production process for preparing the material is not particularly limited. In the present invention, basically, the carbon material can be singly dissolved in the internal phase for fiber formation, but the carbon material may be dissolved along with another fiber material (synthetic resin) and a thickener, for example, polyamide, polyester, polyacrylonitrile, polyvinyl alcohol, or cellulose or a derivative thereof in the internal phase. Examples of the carbon fibers include PAN-based (Polyacrylonitrile) carbon fibers provided from acrylic fibers and pitch-based (PITCH) carbon fibers provided from pitch. Examples of the carbon nanotubes (CNTs) can include single wall CNTs (Single Wall Carbon Nanotubes: SWNTs) and multi wall CNTs (Multi Wall Carbon Nanotubes: MWNTs) according to the classification based on the number of peripheral walls, and chiral (helical) type, zigzag type, and armchair type CNTs according to the classification based on the structural difference of graphene sheets. SWNTs having a large aspect ratio (e.g., $1\times10^2$ or more) and large intermolecular force are preferred from the viewpoint of ease of fiber formation. The upper limit of the length of the CNTs is not particularly limited and about 10 μm to a plurality of millimeters, for example.

In a typical embodiment of the present invention, as the fiber material for production of the wet spun fibers or the film material for production of the wet formed film, polyamic acid as an example of the polyamide resin, polyethylene terephthalate (PET) as an example of the polyester resin, cellulose acetate as an example of the cellulose or a derivative thereof, polylactic acid as an example of the polyester resin, polystyrene or polyvinyl alcohol as an example of the vinyl resin, or carbon fibers as an example of the carbon material are used.

Polyamic acid is a generic term for polymers (polyamide resins) having a chemical structure of pyromellitic dianhydride and 4,4'-diaminodiphenyl ether bonded via amide bonds, for example, as represented by the following structural formula (I). When such polyamic acid is dehydrated by heating or a catalyst to thereby allow a cyclization (imidization) reaction to proceed, a polyimide resin is provided. Although the properties of polyamic acid may vary in accordance with its monomer (synthesis raw material) and the average molecular weight and molecular weight distribution of its aggregate, it is only required that a polyamic acid having appropriate properties in accordance with the embodiment be used in the present invention. Polyamic acids of various properties may be synthesized by a known process or may be commercially available. The manner in which the polyamic acid to be used in the present invention is provided is not particularly limited.

[Formula 1]

(I)

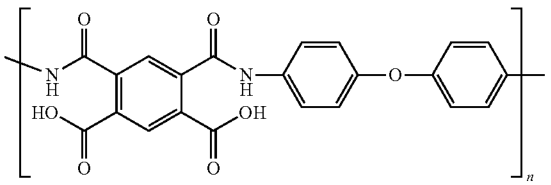

Polyethylene terephthalate (PET) is a polymer (a type of polyester resin) having a chemical structure of ethylene glycol and terephthalic acid bonded via an ester bond, as represented by the following structural formula (II). Although the properties of polyethylene terephthalate may vary in accordance with the average molecular weight and molecular weight distribution of its aggregate, it is only required that a polyethylene terephthalate having appropriate properties in accordance with the embodiment be used in the present invention. Polyethylene terephthalates of various properties may be synthesized by a known process or may be commercially available. The manner in which the polyethylene terephthalate to be used in the present invention is provided is not particularly limited.

[Formula 2]

(II)

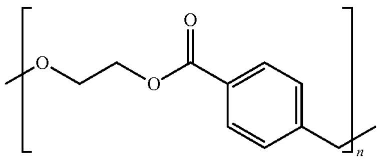

Cellulose acetate is a polymer (a type of cellulose derivative) having a chemical structure in which hydroxyl groups possessed by the cellulose (three groups are present per repeating unit) are partially acetated, as represented by the following structural formula (III). Although the properties of cellulose acetate may vary in accordance with the degree of polymerization (e.g., a 6% viscosity is used as the indicator thereof) and a degree of acetylation (a degree of acetated hydroxyl groups; a degree or percentage of substitution is used as the indicator) of its aggregate, it is only required that a cellulose acetate having appropriate properties in accordance with the embodiment be used in the present invention. Cellulose acetates of various properties may be synthesized by a known process or may be commercially available. The manner in which the cellulose acetate to be used in the present invention is provided is not particularly limited.

[Formula 3]

(III)

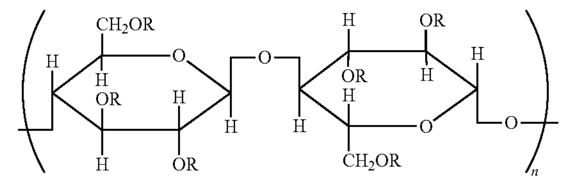

R= $-COCH_3$ or H

Polylactic acid (PLA) is a polymer (a type of polyester resin) having a chemical structure in which lactic acid units are bonded via an ester bond, as represented by the following structural formula (IV). Although the properties of polylactic acid may vary in accordance with the average molecular weight and molecular weight distribution of its aggregate, it is only required that a polylactic acid having appropriate properties in accordance with the embodiment be used in the present invention. Polylactic acids of various properties may be synthesized by a known process or may be commercially available. The manner in which the polylactic acid to be used in the present invention is provided is not particularly limited.

[Formula 4]

(IV)

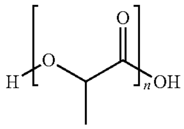

Good Solvent

As the good solvent included in the internal phase, in accordance with the fiber/film material, a solvent that can sufficiently dissolve the material can be appropriately selected and used. The good solvent, which is generally an organic solvent, may be a non-polar solvent or may be a polar solvent (aprotic solvent or protic solvent). Examples of the good solvent include aliphatic hydrocarbons (such as hexane and octane), aromatic hydrocarbons (such as benzene, toluene, and xylene), esters (such as methyl acetate and ethyl acetate), ethers (including cyclic ethers, such as diethyl ether and tetrahydrofuran), ketones (including cyclic ketones, such as acetone and N-methyl-2-pyrrolidone), alcohols (such as 1-butanol, 1-propanol, 2-propanol, ethanol, and methanol), halogen-containing solvents (such as chloroform, dichloromethane, and hexafluoro-2-propanol), carbonates, organic acids, other organic solvents (such as dimethyl sulfoxide, dimethylacetamide, and N,N-dimethylformamide), water, ionic liquids, and supercritical fluids. One of these good solvents may be used singly or two or more of these may be used in mixture. As the good solvent in the present invention, good solvents for use in dissolving various fiber/film materials in known wet production methods can be used in the same manner.

Other Components to be Blended in Internal Phase

Materials other than the fiber/film material and good solvent may be added to the internal phase as required. For example, a surfactant, a salt, a metal compound, a bioactive agent such as a drug, nanoparticles, a catalyst, a monomer, and a non-solvent (a solvent component that does not diffuse into the external phase) are dissolved along with the fiber/film material in the good solvent, and the solution may be used as the internal phase.

For example, when the fiber/film material is a carbon material, a nonionic surfactant, anionic surfactant, or cationic surfactant may be blended as a dispersant to the internal phase. Examples of the nonionic surfactant include polyoxyethylene alkyl ethers, polyoxyethylene alkyl phenyl ethers, sorbitan fatty acid esters, sucrose fatty acid esters, polyoxyethylene sorbitan fatty acid esters, polyoxyethylene sorbitol fatty acid esters, glycerin fatty acid esters, polyoxyethylene fatty acid esters, and polyoxyethylene—polyoxypropylene block copolymers. Examples of the anionic surfactant include sodium cholate, sodium deoxycholate, sodium alkylbenzene sulfonates, alkyl alcohol sulfate salts, sodium alkyl diphenyl ether disulfonates, sodium polyoxyethylene alkyl ether sulfates, sodium dialkyl sulfosuccinates, sodium alkylally sulfosuccinates, sodium N-lauroylsarcosinate, sodium polyoxyethylene alkyl phenyl ether sulfates, sodium (meth)acryloyl polyoxyalkylene sulfates, alkyl alcohol phosphates, and bile salts. Examples of the cationic surfactant include tetraalkylammonium halides, alkyl pyridinium halides, and alkylimidazoline halides.

Poor Solvent

As the poor solvent included in the external phase, a solvent that can diffuse the good solvent and precipitate the fiber/film material can be appropriately selected and used in accordance with the fiber/film material and good solvent. Examples of typical poor solvents include water (pure water) and organic solvents. One of these poor solvents may be used singly or two or more of these may be used in mixture. As the poor solvent in the present invention, poor solvents for use in molding various fiber/film materials (coagulating the solution including the fiber/film material dissolved) in known wet production methods can be used in the same manner.

Alternatively, water and a solvent highly compatible with water are mixed for use as the poor solvent. For example, a mixed solvent of water and a solvent to be used as the good solvent of the internal aqueous phase (e.g., N-methyl-2-pyrrolidone), that is, a good solvent diluted enough to control the diffusion rate of the fiber/film material may be used as the poor solvent of the external aqueous phase.

Other Components to be Blended in External Phase

Materials other than the poor solvent may be added to the external phase as required. For example, a nonionic surfactant (trade name: "Tween 80" (general name: polyoxyethylene sorbitan monooleate), "ACRYDIC" (DIC Corporation), or the like) or other surfactants (compounds having a surface active function) may be blended to the external phase. Such surfactants have action of facilitating diffusion (migration) of the good solvent into the external phase by lowering the tension of the interface between the good solvent included in the internal phase and the poor solvent included in the external phase or raising the saturation solubility of the good solvent included in the internal phase in the external phase. For example, when the fiber/film material is polyamic acid and the good solvent is N-methyl-2-pyrrolidone, or when the fiber/film material is polylactic acid and the good solvent is tetrahydrofuran, a nonionic surfactant is preferably added to water as the poor solvent for use. The concentration of the surfactant in the external phase may be appropriately adjusted in consideration of the action of the surfactant described above, and is usually 0 to 10 wt % and preferably 0 to 5 wt %, although some fiber/film materials may not require the surfactant.

In a preferred embodiment of the present invention, the fiber/film material may be one of eight materials listed in the following table, for example. Herein, embodiments using one of these eight fiber/film materials are each referred to as the first to eighth embodiments. A combination of the good solvent and poor solvent to be used for the fiber/film material of each embodiment may be as shown in the following table. However, those skilled in the art could appreciate that other combinations of the good solvent and poor solvent may be employed for the fiber/film materials listed in the table and could also appreciate appropriate combinations of the good solvent and poor solvent for other fiber/film materials not listed in the table.

TABLE 1

| Embodiment | Fiber/film material | Good solvent | Poor solvent |
|---|---|---|---|
| 1 | Polyamic acid | N-methyl-2-pyrrolidone (NMP), dimethylacetamide (DMAc), DMF, DMSO | Water (optionally containing a surfactant), hexane, cyclohexane |
| 2 | Polyethylene terephthalate | Hexafluoro-2-propanol (HFIP), trifluoroacetic acid (TFA) | Water (optionally containing a surfactant), isopropanol |
| 3 | Cellulose acetate | Ethyl acetate, methyl acetate, acetone, tetrahydrofuran (THF), chloroform, methyl ethyl ketone (MEK), dioxane, NMP, DMSO | Water (optionally containing a surfactant) |
| 4 | Polylactic acid | Ethyl acetate, methyl acetate, THF, dioxane | Water (optionally containing a surfactant) |
| 5 | Polystyrene | Ethyl acetate, methyl acetate, THF | Water (optionally containing a surfactant) |
| 6 | Polyvinyl alcohol | Water | Acetone, 2-propanol |
| 7 | Carbon material | Water (optionally containing a dispersant such as sodium cholate or sodium deoxycholate) | Lower alcohols such as ethanol, methanol, 1-propanol, 2-propanol, and tert-butanol (optionally containing a surfactant), ethylene glycol, 2-methoxyethanol, 1,4-dioxane, N,N-dimethylacetamide (DMAc), N,N-dimethylformamide (DMF), dimethyl sulfoxide (DMSO), N-methylformamide (NMF), and N-methyl-2-pyrrolidone (NMP) |
| 8 | Polyamino acid (such as polyglutamic acid) | Chloroform, tetrahydrofuran (THF), 1,2-dichloroethane, 1,4-dioxane, benzene, dimethylformamide, N,N-dimethylacetamide, 1,1,1,3,3,3-hexafluoro-2-propanol | Ethanol, methanol, 2-propanol, water (optionally containing a surfactant) |

Preparation Method

The internal phase and external phase are each only required to be prepared by mixing and dissolution using the fiber/film material, good solvent, poor solvent, and the like described above by an ordinary manner, before subjected to the production method of the present invention.

The concentration of the fiber/film material in the internal phase may be adjusted as appropriate, in accordance with the type of the fiber/film material and good solvent to be used and the type of the poor solvent and other components (such as a surfactant) included in the external phase, so that the viscosity of the internal phase falls within an appropriate range as necessary, in consideration of the properties (fiber diameter, film thickness, and birefringence index) and applications of the fiber/film to be provided. For example, in accordance with the type of the fiber/film material, the fiber diameter and birefringence index of fibers to be provided and the thickness of a film to be provided can be adjusted by the concentration of the fiber/film material in the internal phase and the flow rate ratio of the external phase and the internal phase.

For example, when the fiber/film material is a polyamide resin (typically, polyamic acid in the first embodiment, and polyamino acid in the eighth embodiment), the concentration in the internal phase is generally 1 to 30 wt %. For example, when the fiber/film material is polyamic acid, the concentration is generally 1 to 20 wt % and preferably 1 to 10 wt %. When the fiber/film material is polyamino acid, the concentration is generally 1 to 30 wt % and preferably 1 to 20 wt %.

When the above internal phase is used, the external phase line speed and flow rate ratio in the method for producing wet spun fibers are generally 0.1 $ms^{-1}$ or more and 10 or more, respectively, in the case where the fiber material is polyamic acid, preferably 0.5 $ms^{-1}$ or more and 100 or more, respectively, and in the case where the fiber material is polyamino acid, preferably 0.5 $ms^{-1}$ or more and 100 or more, respectively.

When the fiber/film material is a polyester resin (typically, PET in the second embodiment, and polylactic acid in the fourth embodiment), the concentration in the internal phase is generally 1 to 50 wt %. For example, when the fiber/film material is PET, the concentration is generally 1 to 20 wt % and preferably 2 to 10 wt %. In the case of polylactic acid, the concentration is generally 5 to 50 wt % and preferably 10 to 50 wt %.

When the above internal phase is used, the external phase line speed and flow rate ratio in the method for producing wet spun fibers are generally 0.1 $ms^{-1}$ or more and 10 or more, respectively, in the case where the fiber material is PET, preferably 1.0 $ms^{-1}$ or more and 300 or more, respectively, and in the case where the fiber material is polylactic acid, preferably 0.5 $ms^{-1}$ or more and 20 or more, respectively.

When the above internal phase is used, the flow rate ratio in the method for producing a wet formed film is generally 1 or more, and in the case where the film material is polylactic acid, preferably 100 or more. The external phase line speed in this case may be generally 0.1 $ms^{-1}$ or more, and in the case where the film material is polylactic acid, may be preferably 0.5 $ms^{-1}$ or more.

When the fiber/film material is cellulose or a derivative thereof (typically, cellulose acetate in the third embodiment), the concentration in the internal phase is generally 1 to 30 wt % and preferably 2 to 20 wt %.

When the above internal phase is used, the external phase line speed and flow rate ratio in the method for producing wet spun fibers are generally 0.1 $ms^{-1}$ or more and 10 or more, respectively, and preferably 0.5 $ms^{-1}$ or more and 100 or more, respectively.

When the fiber/film material is a vinyl resin (typically, polystyrene in the fifth embodiment, and polyvinyl alcohol in the sixth embodiment), the concentration in the internal phase is generally about 1 to 50 wt % and preferably 2 to 40 wt %.

When the above internal phase is used, the external phase line speed and flow rate ratio in the method for producing wet spun fibers are generally 0.1 $ms^{-1}$ or more and 10 or more, respectively, and in the case where the material is polystyrene or polyvinyl alcohol, preferably 0.2 $ms^{-1}$ or more and 25 or more, respectively.

When the above internal phase is used, the flow rate ratio in the method for producing a wet formed film is generally 1 or more, and in the case where the film material is polystyrene or polyvinyl alcohol, preferably 100 or more. The external phase line speed in this case may be generally 0.1 $ms^{-1}$ or more, and in the case where the film material is polystyrene or polyvinyl alcohol, for example, may be preferably 0.5 $ms^{-1}$ or more and more preferably 1.0 $ms^{-1}$ or more.

When the fiber/film material is a carbon material (typically carbon fibers in the seventh embodiment), the concentration in the internal phase is generally 0.1 to 2 wt % and preferably 0.1 to 0.5 wt %.

When the above internal phase is used, the external phase line speed and flow rate ratio in the method for producing wet spun fibers are generally 0.1 $ms^{-1}$ or more and 10 or more, respectively, and preferably 0.25 $ms^{-1}$ or more and 50 or more, respectively.

<Production Step>

Both the methods for producing wet spun fibers and a wet formed film of the present invention can generally include a first step (extrusion step) and a second step (formation step) as described below and also can include a third step (winding step) as required. These first to third steps are usually conducted simultaneously and sequentially.

First Step: Extrusion Step

First step in the production method of the present invention: an extrusion step is a step of extruding an internal phase comprising a fiber/film material and a good solvent for the fiber/film material in a linear form from the end of the internal pipe of an apparatus into an external phase comprising a poor solvent for the fiber/film material, the external phase flowing in the external pipe of the apparatus.

In this extrusion step, when wet spun fibers are produced, a double-walled pipe type micronozzle apparatus having an appropriate internal pipe diameter, orifice diameter, piping diameter, and orifice length is used and the flow rate of each of the internal phase and the external phase is appropriately set to thereby adjust the flow rate ratio of the internal phase and the external phase and the external phase line speed at the orifice portion at which the internal phase and the external phase merge within a predetermined range. This adjustment enables each fiber to be provided to have a desired cross-sectional diameter (fiber diameter) and birefringence index. When a wet formed film is produced, a double-walled pipe type micronozzle apparatus having appropriate internal pipe minor and major diameters, discharge port minor and major diameters, orifice minor and major diameters, orifice length and piping diameter is used and the flow rate of each of the internal phase and the external phase is appropriately set to thereby adjust the flow rate ratio of the internal phase and the external phase and the external phase line speed at the orifice portion at which the internal phase and the external phase merge within a predetermined range. This adjustment enables a film to be provided to have a desired aspect ratio and thickness and preferably a desired degree of stretching.

In the present invention, the flow rate of the external phase to the internal phase flow rate (flow rate ratio) is caused to be a predetermined value or more. The flow rate ratio can be adjusted as appropriate in accordance with the fiber/film material, poor solvent, good solvent, and the like included in the internal phase and external phase to be used and also in accordance with the fiber diameter and birefringence index (orientation) of each fiber to be produced and the aspect ratio, thickness, degree of stretching, and the like of a film to be produced, and the range of the flow rate ratio is not particularly limited. Generally, a larger value of the flow rate ratio leads to increase in the diffusion and removal ratio of the good solvent of the internal phase into the external phase to thereby result in a markedly reduced cross sectional area of the internal phase at the orifice portion. Thus, in wet spun fibers, fibers to be provided have a smaller cross-sectional diameter, whereas the line speed in the longitudinal direction of the fibers tends to increase to thereby make the birefringence index higher. In a wet formed film, a film to be provided tends to have a smaller thickness, a larger aspect ratio, and preferably a larger degree of stretching. The flow rate ratio in the present invention for each of the wet spun fibers and the wet formed film may be, for example, 1 or more, 10 or more, 100 or more, 1,000 or more, 2,000 or more, 5,000 or more, and 10,000 or more. The upper limit value of the flow rate ratio can be, but not particularly limited to, for example, 100,000 or less, 10,000 or less, 5,000 or less, 2,000 or less, and 1,000 or less, for each of the wet spun fibers and the wet formed film. An excessively high flow rate ratio makes the spinning or film formation operation difficult, or an excessively low flow rate ratio (particularly, an excessively low external phase flow rate) causes clogging of the nozzle or the like during spinning or film formation, and then, desired wet spun fibers or a wet formed film may not be provided. Thus, the flow rate ratio is only required to be adjusted as appropriate within a range where such problems do not occur. As an exemplary preferred embodiment of the present invention, for a specific fiber material, a flow rate ratio that can achieve a fiber diameter and a birefringence index that have not been achieved by a conventional production method (particularly a wet spinning method), for example, a flow rate ratio at which the fiber diameter is 1 μm or less (i.e., a flow rate ratio that enables fibers each having a nano-sized fiber diameter to be produced) can be selected. As an exemplary preferred embodiment of the present invention, for a specific film material, a flow rate ratio that can achieve an aspect ratio and a film thickness and preferably further a degree of stretching that have not been achieved by a conventional production method (particularly a wet film formation method), for example, a flow rate ratio at which the film thickness is 1 μm or less (i.e., a flow rate ratio that enables a film having a nano-sized thickness to be produced) can be selected.

The internal phase flow rate and external phase flow rate in the method for producing wet spun fibers may be adjusted as appropriate such that the flow rate ratio falls within the above range and that the external phase line speed at the orifice portion falls within a predetermined range, and the flow rates are not particularly limited. The internal phase flow rate is usually 1 to 100 μL $min^{-1}$ and preferably 1 to 10 μL $min^{-1}$. The external phase flow rate is usually 100 to 500,000 μL $min^{-1}$ and preferably 1,000 to 20,000 μL $min^{-1}$.

The external phase line speed at the orifice portion can be regarded as a value to be determined by the following calculation expression.

[Expression 1]

$$v=f/s \qquad \text{Expression (1)}$$

(v: external phase line speed [m/s], f: external phase flow rate [$m^3$/s], s: orifice cross sectional area [$m^2$])

When the double-walled pipe micronozzle apparatus for wet spun fibers has an internal structure as illustrated in FIG. 1[B], $s=(b/2)^2\pi$ (b: orifice diameter) can be assumed. s can be adjusted as required in consideration of each value of the internal phase flow rate and the external phase flow rate as long as an external phase line speed sufficient to enhance the orientation can be achieved. The external phase line speed at the orifice portion is determined by the internal phase flow rate and external phase flow rate and s. The external phase line speed in the method for producing wet spun fibers of the present invention may be, for example, 0.1 $ms^{-1}$ or more, 0.5 $ms^{-1}$ or more, 1 $ms^{-1}$ or more, 5 $ms^{-1}$ or more, and 10 $ms^{-1}$ or more. The upper limit value of the external phase line speed in the method for producing wet spun fibers of the present invention may be, but not particularly limited to, for example, 100 $ms^{-1}$ or less, 50 $ms^{-1}$ or less, and 10 $ms^{-1}$ or less.

The internal phase and external phase flow rates in the method for producing a wet formed film also may be adjusted as appropriate such that the flow rate ratio falls within the above range and that the external phase line speed at the orifice portion preferably falls within a predetermined range, and the flow rates are not particularly limited. The internal phase flow rate is usually 1 to 200 μL $min^{-1}$ and preferably 10 to 150 μL $min^{-1}$. The external phase flow rate is usually 1,000 to 200,000 μL $min^{-1}$ and preferably 5,000 to 100,000 μL $min^{-1}$.

The external phase line speed at the orifice portion in producing a wet formed film also can be regarded as a value to be determined by the expression (1). When the double-walled pipe micronozzle apparatus for a wet formed film has an internal structure as illustrated in FIG. 12[B], s=C×F (C: orifice minor diameter, F: orifice major diameter) can be assumed. s can be adjusted as required in consideration of each value of the internal phase flow rate and the external phase flow rate such that an external phase line speed sufficient to enhance the stretch ratio and the like can be achieved. The external phase line speed in a preferred embodiment of the method for producing a wet formed film of the present invention may be, for example, 0.1 $ms^{-1}$ or more, 1 $ms^{-1}$ or more, 10 $ms^{-1}$ or more, 20 $ms^{-1}$ or more, and 40 $ms^{-1}$ or more. The upper limit value of the external phase line speed in the method for producing a wet formed film of the present invention may be, but not particularly limited to, for example, 200 $ms^{-1}$ or less, 160 $ms^{-1}$ or less, 100 $ms^{-1}$ or less, and 10 $ms^{-1}$ or less.

Second Step: Formation Step

Second step in the production method of the present invention: the formation step is a step of forming the fiber material, included in the internal phase extruded by the extrusion step as described above in a linear form into the external phase, into fibers, or a step of forming the film material, included in the internal phase extruded by the extrusion step as described above in a sheet form into the external phase, into a film. Specifically, the second step is a step in which diffusion of the good solvent in the internal phase into the external phase causes the fiber/film material in the internal phase to precipitate to thereby produce fibers made of the fiber material or a film made of the film material. Here, the term "diffusion" refers to migration of the good solvent in the internal phase into the external phase until the saturation solubility of the good solvent in the external phase is reached. In this case, disturbance of the interface may be stabilized by addition of components such as the surfactant as described above to the external phase to thereby enhance the uniformity of the fiber diameters or film thicknesses.

In the formation step, taking up the fibers or film initially formed (winding in the third step described subsequently may be acceptable), or collecting the fibers or film to a position distant from the orifice prevents the fibers or film previously formed from disturbing subsequent formation of fibers or a film. Thus, the formation step can proceed efficiently.

Third Step: Winding Step

Third step that can be provided as required in the production method of the present invention: the winding step is a step of winding the fibers or film provided by the above formation step. In consideration of the application of fibers or a film to be produced (e.g., from the viewpoint of the stress, Ih/Iv, and the like of the fibers including a carbon material as the material), the winding step may be provided if winding is more advantageous. "Ih/Iv" is a ratio of the Raman intensity of the G band provided by measuring fibers in the horizontal direction with respect to a polarized laser beam, Ih, and the Raman intensity of the G band provided by measuring the fibers in the vertical direction with respect to the polarized laser beam, Iv, in polarized Raman measurement. A larger Ih/Iv value means a higher orientation, and Ih/Iv may be used as an indicator of the orientation (see WO 2014/185497).

In the method for producing wet spun fibers of the present invention, the operational effects provided by the adjustment of the external phase line speed and the like as described above enable fibers having a desired fiber diameter and birefringence index to be produced, even if stretching processing (winding the fibers at a speed faster than the extrusion speed of the internal phase in the extrusion step) is not conducted. Similarly in the method for producing a wet formed film of the present invention, a film having a desired aspect ratio, a desired film thickness, and preferably a desired degree of stretching can be produced even if stretching processing is not conducted. Accordingly, unless stretching processing is required separately due to specific purposes such as further improvement in properties (e.g., stress and Ih/Iv) of the fibers or film, no stretching processing is conducted in the winding step of the present invention. The winding speed in the case where stretching processing is conducted may be adjusted as appropriate in accordance with the fiber/film material and may be 0.1 to 20 cm $s^{-1}$ and preferably 0.5 to 10 cm $s^{-1}$ in the case where, for example, a carbon material or a different material is used as the fiber/film material.

—Wet Spun Fibers—

The wet spun fibers of the present invention, which may be obtained by the method for producing wet spun fibers of the present invention, each have a fiber diameter and a birefringence index (orientation) that vary in accordance with the line speed ratio and the like in the extrusion step as described above.

The term "fiber diameter" referred to herein is an average value of fiber diameters (diameters when the cross section of a wet spun fiber is regarded as a circle) at a plurality of points of the wet spun fiber, and can be calculated by measuring fiber diameters of a sufficient number (e.g., 50 points) by means of observation using a scanning electron microscope (SEM), for example.

The term "birefringence index" is also an average value of birefringence indices at a plurality of points of the wet spun fiber. Retardations of a sufficient number (e.g., 50 points) are measured by means of observation using a polarized light microscope, for example, and the birefringence index can be calculated by the following expression using the retardations and the fiber diameter.

$$\Delta N=R/d \qquad \text{[Expression 2]}$$

(ΔN: birefringence index, R: retardation [nm], d: fiber diameter [nm])

In comparison between wet spun fibers formed of the same fiber material provided by the production method of the present invention, irrespective of the type of wet spun fibers (fiber material), the birefringence index tends to be higher as the fiber diameter is smaller, and a regression equation can be formed. In the present invention, by means of measurement of the fiber diameter and birefringence index of a plurality of wet spun fibers formed of the same fiber material each having a fiber diameter changed by conditions such as line speed ratio and the like as described above and formation of an regression equation thereof, the birefringence index of wet spun fibers having a certain fiber diameter provided by the production method of the present invention can be estimated (by interpolation or extrapolation of the fiber diameter into the above regression equation). However, the regression equation for wet spun fibers having a thinned diameter as well as enhanced molecular orientation to be provided by the production method of the present invention is different from the regression equation for wet spun fibers to be provided by a different production method (the degree of enhancement of the molecular orientation in association with the thinning of the diameter according to a conventional common stretching method or the like is not comparable to that in the present invention), even if the wet spun fibers are formed of the same fiber material.

The fiber diameter and birefringence index of the wet spun fibers of the present invention are adjusted as appropriate in accordance with the application, and the ranges thereof are not particularly limited. The fiber diameter may be, for example, 1,000 μm or less, 100 μm or less, 10 μm or less, or 1 μm or less. The lower limit value of the fiber diameter may be, but not particularly limited to, for example, 1 nm or more, 10 nm or more, 100 nm or more, and 1,000 nm or more. The birefringence index may be, for example, 0.0001 or more, 0.001 or more, and 0.01 or more. The upper limit value of the birefringence index may be, but not particularly limited to, for example, 0.1 or less, 0.05 or less, and 0.01 or less.

The material for the wet spun fibers of the present invention is not particularly limited as long as the material can be formed into fibers by a method for producing wet spun fibers using the double-walled pipe type micronozzle apparatus as described above. Briefly, the material is only required to be capable of being precipitated and formed into fibers when the internal phase including the fiber material and a good solvent for the fiber material is extruded in a linear form into an external phase including a poor solvent for the fiber material. Fiber materials that correspond to materials of the wet spun fibers of the present invention are obvious to those skilled in the art. Examples of typical fiber materials include polyamide, polyester, cellulose or a derivative thereof or carbon materials as described above.

When the fiber material is a polyamide resin (typically, the polyamic acid in the first embodiment and the polyamino acid in the eighth embodiment), the fiber diameter and the birefringence index are generally about 50 μm or less and about 0.001 or more, respectively, preferably 20 μm or less and 0.005 or more, respectively, and more preferably 10 μm or less and 0.01 or more, respectively.

When the fiber material is a polyester resin (typically, the PET in the second embodiment and the polylactic acid in the fourth embodiment), the fiber diameter and the birefringence index are generally about 100 μm or less and about 0.001 or more, respectively and preferably 50 μm or less and 0.002 or more, respectively.

When the fiber material is cellulose or a derivative thereof (typically, the cellulose acetate in the third embodiment), the fiber diameter and the birefringence index are generally about 50 μm or less and about 0.001 or more and preferably 10 μm or less and 0.005 or more, respectively.

When the fiber material is a vinyl resin (typically, the polystyrene in the fifth embodiment and the polyvinyl alcohol in the sixth embodiment), the fiber diameter and the birefringence index are generally about 100 μm or less and about 0.001 or more and preferably 50 μm or less (more preferably 10 μm or less in the case of the polyvinyl alcohol) and 0.002 or more, respectively.

When the fiber material is a carbon material (typically, the carbon fiber in the seventh embodiment), the fiber diameter and the birefringence index are generally about 50 μm or less and about 0.001 or more and preferably 20 μm or less and 0.002 or more, respectively.

Applications of the wet spun fibers of the present invention are not particularly limited, and the wet spun fibers of the present invention may be used for various purposes suitable for wet spun fiber materials and the fiber diameter and birefringence index (orientation). For example, similarly to conventional so-called nanofibers, the wet spun fibers of the present invention may be used as materials for medical devices (bioimplantable materials, DDSs, sutures, artificial blood vessels, and the like), cosmetic tools, cell culture devices (anchorages for proliferation (scaffolds) and the like), filters, materials for batteries, electromagnetic wave shielding materials, electroconductive materials, thermally conductive materials, clothing, fiber-reinforced plastics, painting materials, and the like.

—Wet Formed Film—

The wet formed film of the present invention, which is provided by the method for producing a wet formed film of the present invention, has the aspect ratio and film thickness, and preferably further, the degree of stretching, which vary in accordance with the internal phase flow rate and external phase flow rate (flow rate ratio), and preferably further, the external phase line speed ratio, in the extrusion step described above.

The term "film thickness" referred to herein is an average value of film thicknesses at a plurality of points of the wet formed film, which value can be calculated by measuring film thicknesses of a sufficient number (e.g., 50 points) by means of observation using an SEM, for example. Similarly, the "aspect ratio" is an average value of aspect ratios at a plurality of points of the wet formed film, which value can be calculated by measuring film thicknesses and widths in the transverse direction of a sufficient number (e.g., 50 points) by means of observation using an SEM, for example, and converting the values into the aspect ratio (width in the transverse direction/film thickness).

The film thickness of the wet formed film of the present invention is adjusted as appropriate in accordance with the application, and the range thereof is not particularly limited. The film thickness may be, for example, 1,000 μm or less, 100 μm or less, 10 μm or less, or 1 μm or less. The lower limit value of the film thickness may be, but not particularly limited to, for example, 1 nm or more, 10 nm or more, 100 nm or more, or 1,000 nm or more. The aspect ratio may be, for example, 100 or more or 1,000 or more. The upper limit value of the aspect ratio is not particularly limited.

The material for the wet formed film of the present invention is not particularly limited as long as the material can be formed into a film by a method for producing a wet formed film using the double-walled pipe type micronozzle apparatus as described above. Briefly, the material is only required to be capable of being precipitated and formed into a film when an internal phase including the film material and a good solvent for the film material is extruded in a sheet form into an external phase including a poor solvent for the film material. Film materials that correspond to materials of the wet formed film of the present invention are obvious to those skilled in the art. Examples of typical film materials include polyamide, polyester, cellulose or a derivative thereof or carbon materials as described above.

When the film material is a polyester resin (typically, the polylactic acid in the fourth embodiment), the film thickness is preferably 1,000 μm or less and more preferably 500 μm or less. The aspect ratio is preferably 100 or more and more preferably 1,000 or more.

When the film material is a vinyl resin (typically, the polystyrene in the fifth embodiment, and the polyvinyl alcohol in the sixth embodiment), the film thickness is preferably 2,000 μm or less, more preferably 1,000 μm or less, and more preferably 500 μm or less. The aspect ratio is preferably 100 or more and more preferably 1,000 or more.

Applications of the wet formed film of the present invention are not particularly limited, and the wet formed film of the present invention may be used for various purposes suitable for wet formed film materials and the film thickness and aspect ratio. For example, the wet formed film of the present invention may be used as materials for medical devices (bioimplantable materials, DDSs, sutures, artificial blood vessels, and the like), cosmetic tools, cell culture devices (anchorages for proliferation (scaffolds) and the like), filters, materials for batteries, electromagnetic wave shielding materials, electroconductive materials, thermally conductive materials, clothing, fiber-reinforced plastics, painting materials, and the like.

EXAMPLES

Hereinbelow, the present invention will be more concretely described based on embodiments (Examples 1 to 18), in which wet spun fibers have been produced, which fibers are made of polyamic acid, polyethylene terephthalate (PET), cellulose acetate, polylactic acid (PLA), polystyrene (PS), and polyvinyl alcohol (PVA) as typical fiber materials, using a double-walled pipe type micronozzle apparatus having the internal structure illustrated in FIG. 1 (particularly, one having the size of each portion as shown in FIG. 1[B], orifice cross sectional area: $(b/2)^2\pi$=about $3.14\times10^{-8}$ $m^2$) and embodiments (Examples 19 to 21), in which wet formed films have been produced, which films are made of polystyrene (PS), polylactic acid (PLA), and polyvinyl alcohol (PVA) as typical film materials, using a double-walled pipe type micronozzle apparatus having the internal structure illustrated in FIG. 20 (particularly, one having the size of each portion as shown in FIG. 20[B], orifice cross sectional area: $4\times10^{-7}$ $m^2$). However, it is obvious for those skilled in the art that the present invention should not be construed as limited to the embodiments using the double-walled pipe type micronozzle apparatuses and fiber materials and film materials. Even in the case of using a double-walled pipe type micronozzle apparatus having an internal structure of a size different from that of the double-walled pipe type micronozzle apparatus used in Examples and a fiber material for wet spun fibers and a film material for a wet formed film other than the fiber materials and film materials used in Examples, those skilled in the art could appreciate that the present invention can be carried out in the same manner.

[Example 1] Polyamic Acid Fibers

A solution of the internal phase and a solution of the external phase were each prepared under conditions shown in Table 2, and wet spun fibers (polyamic acid fibers) made of a polyamic acid were produced using a predetermined double-walled pipe type micronozzle apparatus for wet spun fibers. The polyamic acid used was one represented by the structural formula in which pyromellitic dianhydride and 4,4'-diaminodiphenyl ether are bonded via an amide bond (poly(pyromellitic dianhydride-co-4,4'-oxydianiline), amic acid solution, 15 to 16 wt % N-Methyl-2-pyrrolidone solution, manufactured by Sigma Aldrich).

An SEM micrograph of Sample 1-10 in Table 2 is shown in FIG. 2[A]. Polyamic acid fibers having an average diameter (fiber diameter) of about 3 μm were provided under the conditions.

The flow rate ratio (external phase flow rate/internal phase flow rate) calculated from the internal phase flow rate and external phase flow rate shown in Table 2, and the fiber diameter and birefringence index of each sample of the polyamic acid fibers provided under the conditions are shown in FIG. 2[B]. As can be seen from FIG. 2[B], the diameter of the polyamic acid fibers provided decreases as the flow rate ratio increases, whereas the birefringence index tends to increase. The results suggest that molecular orientation of the polyamic acid molecules in the fibers in the longitudinal axis direction is enhanced as the flow rate ratio increases.

TABLE 2

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 1-1 | 10.5 wt % PAA*/ NMP** | 2 wt % Tween80/ (pure water/ NMP = 5/5(v/v)) | 10 | 1,000 | 0.53 |
| 1-2 | 10.5 wt % PAA/ NMP | 2 wt % Tween80/ (pure water/ NMP = 5/5(v/v)) | 10 | 2,000 | 1.06 |
| 1-3 | 10.5 wt % PAA/ NMP | 2 wt % Tween80/ (pure water/ NMP = 5/5(v/v)) | 10 | 3,000 | 1.59 |
| 1-4 | 10.5 wt % PAA/NMP | 2 wt % Tween80/ (pure water/ NMP = 5/5(v/v)) | 10 | 4,000 | 2.12 |
| 1-5 | 10.5 wt % PAA/ NMP | 2 wt % Tween80/ (pure water/ NMP = 5/5(v/v)) | 10 | 5,000 | 2.65 |
| 1-6 | 10.5 wt % PAA/ NMP | 2 wt % Tween80/ (pure water/ NMP = 5/5(v/v)) | 10 | 6,000 | 3.18 |
| 1-7 | 10.5 wt % PAA/ NMP | 2 wt % Tween80/ (pure water/ NMP = 5/5(v/v)) | 10 | 7,000 | 3.71 |
| 1-8 | 10.5 wt % PAA/ NMP | 2 wt % Tween80/ (pure water/ NMP = 5/5(v/v)) | 10 | 8,000 | 4.24 |
| 1-9 | 10.5 wt % PAA/ NMP | 2 wt % Tween80/ (pure water/ NMP = 5/5(v/v)) | 10 | 9,000 | 4.77 |

TABLE 2-continued

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 1-10 | 10.5 wt % PAA/ NMP | 2 wt % Tween80/ (pure water/ NMP = 5/5(v/v)) | 10 | 10,000 | 5.31 |

PAA*: polyamic acid,
NMP**: N-methyl-2- pyrrolidone

[Example 2] Polyethylene Terephthalate (PET) Fibers

A solution of the internal phase and a solution of the external phase were each prepared under conditions shown in Table 3, and wet spun fibers (PET fibers) made of a PET were produced using a predetermined double-walled pipe type micronozzle apparatus for wet spun fibers. The PET used in Example is a commercially available product manufactured by Sigma Aldrich (Mw: 130,000).

An SEM micrograph of Sample 2-4 in Table 3 is shown in FIG. 3[A]. PET fibers having an average diameter (fiber diameter) of about 1.5 μm were provided under the conditions.

The flow rate ratio (external phase flow rate/internal phase flow rate) calculated from the internal phase flow rate and external phase flow rate shown in Table 3, and the fiber diameter and birefringence index of each sample of the PET fibers provided under the conditions are shown in FIG. 3[B]. As can be seen from FIG. 3[B], similarly as Example 1, as the flow rate ratio increases, the fiber diameter of the PET fibers provided tends to decrease, and the birefringence index tends to increase. The results suggest that molecular orientation of the PET molecules in the fibers in the longitudinal axis direction is enhanced as the flow rate ratio increases, similarly as Example 1.

TABLE 3

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 2-1 | 10 wt % PET*/HFIP** | pure water | 5 | 4,000 | 2.12 |
| 2-2 | 10 wt % PET/HFIP | pure water | 5 | 5,000 | 2.65 |
| 2-3 | 10 wt % PET/HFIP | pure water | 5 | 6,000 | 3.18 |
| 2-4 | 10 wt % PET/HFIP | pure water | 5 | 7,000 | 3.71 |
| 2-5 | 10 wt % PET/HFIP | pure water | 5 | 8,000 | 4.24 |

PET*: polyethylene terephthalate,
HFIP**: hexafluoro -2-propanol

[Example 3] Cellulose Acetate Fibers

A solution of the internal phase and a solution of the external phase were each prepared under conditions shown in Table 4, and wet spun fibers (cellulose acetate fibers) made of a cellulose acetate were produced using a predetermined double-walled pipe type micronozzle apparatus for wet spun fibers. The cellulose acetate used in Example has a degree of substitution of 5 wt %.

An SEM micrograph of Sample 3-3 in Table 4 is shown in FIG. 4[A]. Cellulose acetate fibers having an average diameter (fiber diameter) of about 2 μm were provided under the conditions.

The flow rate ratio (external phase flow rate/internal phase flow rate) calculated from the internal phase flow rate and external phase flow rate shown in Table 4, and the fiber diameter and birefringence index of each sample of the cellulose acetate fibers provided under the conditions are shown in FIG. 4[B]. As can be seen from FIG. 4[B], similarly as Example 1, as the flow rate ratio increases, the fiber diameter of the cellulose acetate fibers tends to decrease, and the birefringence index tends to increase. The results suggest that molecular orientation of the cellulose acetate molecules in the fibers in the longitudinal axis direction is enhanced as the flow rate ratio increases, similarly as Example 1.

TABLE 4

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 3-1 | 5 wt % cellulose acetate/methyl cellulose | pure water | 10 | 2,000 | 1.06 |
| 3-2 | 5 wt % cellulose acetate/methyl cellulose | pure water | 10 | 3,000 | 1.59 |
| 3-3 | 5 wt % cellulose acetate/methyl cellulose | pure water | 10 | 4,000 | 2.12 |
| 3-4 | 5 wt % cellulose acetate/methyl cellulose | pure water | 10 | 5,000 | 2.65 |
| 3-5 | 5 wt % cellulose acetate/methyl cellulose | pure water | 10 | 6,000 | 3.18 |
| 3-6 | 5 wt % cellulose acetate/methyl cellulose | pure water | 10 | 7,500 | 3.98 |
| 3-7 | 5 wt % cellulose acetate/methyl cellulose | pure water | 10 | 10,000 | 5.31 |

[Example 4] Polylactic Acid (PLA) Fibers (No. 1: Internal Phase Includes THF)

A solution of the internal phase and a solution of the external phase were each prepared under conditions shown in Table 5, and wet spun fibers (PLA fibers) made of a PLA were produced using a predetermined double-walled pipe type micronozzle apparatus for wet spun fibers. The PLA used in Example 4 (and Example 5 and Example 12 described below) is a poly-DL-lactic acid manufactured by Musashino Chemical Laboratory, Ltd. (may be denoted by "PDLDA" in Example 12 described below) (Mw: 115,000).

An SEM micrograph of Sample 4-7 in Table 5 is shown in FIG. 5[A]. PLA fibers having an average diameter (fiber diameter) of about 30 μm were provided under the conditions.

The flow rate ratio (external phase flow rate/internal phase flow rate) calculated from the internal phase flow rate and external phase flow rate shown in Table 5, and the fiber diameter and birefringence index of each sample of the PLA fibers provided under the conditions are shown in FIG. 5[B]. The fiber diameter tended to decrease at an external phase line speed between 33.3 and 167 but showed no substantial change thereafter. The birefringence index increased until the external phase line speed of 167, then decreased slightly, and increased again. As a whole, it can be said that the birefringence index also tends to increase as the external phase line speed increases. This result also suggests that spinning under conditions of a high external phase line speed provides PLA fibers having enhanced molecular orientation in the longitudinal axis direction.

TABLE 5

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 4-1 | 50 wt % PLA*/THF** | 2 wt % Tween80/ pure water | 30 | 1,000 | 0.53 |
| 4-2 | 50 wt % PLA/THF | 2 wt % Tween80/ pure water | 30 | 2,000 | 1.06 |
| 4-3 | 50 wt % PLA/THF | 2 wt % Tween80/ pure water | 30 | 3,000 | 1.59 |
| 4-4 | 50 wt % PLA/THF | 2 wt % Tween80/ pure water | 30 | 4,000 | 2.12 |
| 4-5 | 50 wt % PLA/THF | 2 wt % Tween80/ pure water | 30 | 5,000 | 2.65 |
| 4-6 | 50 wt % PLA/THF | 2 wt % Tween80/ pure water | 30 | 6,000 | 3.18 |
| 4-7 | 50 wt % PLA/THF | 2 wt % Tween80/ pure water | 30 | 7,000 | 371 |
| 4-8 | 50 wt % PLA/THF | 2 wt % Tween80/ pure water | 30 | 8,000 | 4.24 |
| 4-9 | 50 wt % PLA/THF | 2 wt % Tween80/ pure water | 30 | 9,000 | 4.77 |
| 4-10 | 50 wt % PLA/THF | 2 wt % Tween80/ pure water | 30 | 10,000 | 5.31 |

PLA*: polylactic acid,
TFH**: tetrahydrofuran

[Example 5] PLA Fibers (No. 2: Internal Phase Includes Ethyl Acetate)

A solution of the internal phase and a solution of the external phase were each prepared under conditions shown in Table 6, and wet spun fibers (PLA fibers) made of a PLA were produced using a predetermined double-walled pipe type micronozzle apparatus for wet spun fibers.

The flow rate ratio (external phase flow rate/internal phase flow rate) calculated from the internal phase flow rate and external phase flow rate shown in Table 6 and the fiber diameter and birefringence index of each sample of the PLA fibers provided under the conditions are shown in FIG. 6.

TABLE 6

| Sample | Internal phase solution | External phase solution | Internal phase flow rate [μL $min^{-1}$] | External phase flow rate [μL $min^{-1}$] | External phase line speed [m $s^{-}$] |
|---|---|---|---|---|---|
| 5-1 | 50 wt % PLA*/EA** | 2 wt % Tween80/ pure water | 30 | 3,000 | 1.59 |

TABLE 6-continued

| Sample | Internal phase solution | External phase solution | Internal phase flow rate [μL $min^{-1}$] | External phase flow rate [μL $min^{-1}$] | External phase line speed [m $s^{-}$] |
|---|---|---|---|---|---|
| 5-2 | 50 wt % PLA/EA | 2 wt % Tween80/ pure water | 30 | 4,000 | 2.12 |
| 5-3 | 50 wt % PLA/EA | 2 wt % Tween80/ pure water | 30 | 5,000 | 2.65 |
| 5-4 | 50 wt % PLA/EA | 2 wt % Tween80/ pure water | 30 | 6,000 | 3.18 |
| 5-5 | 50 wt % PLA/EA | 2 wt % Tween80/ pure water | 30 | 7,000 | 3.71 |

PLA*: polylactic acid,
EA**: ethyl acetate

[Example 6] Polystyrene (PS) Fibers (No. 1: Internal Phase Includes THF)

A solution of the internal phase and a solution of the external phase were each prepared under conditions shown in Table 7, and wet spun fibers (PS fibers) made of a polystyrene were produced using a predetermined double-walled pipe type micronozzle apparatus for wet spun fibers. The PS used in Example 6 (and Example 7 and Example 11 described below) is a commercially available polystyrene (degree of polymerization: about 2,000).

The flow rate ratio (external phase flow rate/internal phase flow rate) calculated from the internal phase flow rate and external phase flow rate shown in Table 7 and the fiber diameter and birefringence index of each sample of the PS fibers provided under the conditions are shown in FIG. 7.

TABLE 7

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 6-1 | 10 wt % PS*/THF** | 2 wt % Tween80/ pure water | 40 | 3,000 | 1.59 |
| 6-2 | 10 wt % PS/THF | 2 wt % Tween80/ pure water | 40 | 4,000 | 2.12 |
| 6-3 | 10 wt % PS/THF | 2 wt % Tween80/ pure water | 40 | 5,000 | 2.65 |
| 6-4 | 10 wt % PS/THF | 2 wt % Tween80/ pure water | 40 | 6,000 | 3.18 |
| 6-5 | 10 wt % PS/THF | 2 wt % Tween80/ pure water | 40 | 7,000 | 3.71 |
| 6-6 | 10 wt % PS/THF | 2 wt % Tween80/ pure water | 40 | 8,000 | 4.24 |
| 6-7 | 10 wt % PS/THF | 2 wt % Tween80/ pure water | 40 | 9,000 | 4.77 |
| 6-8 | 10 wt % PS/THF | 2 wt % Tween80/ pure water | 40 | 10,000 | 5.31 |

PS*: polystyrene,
TFH**: tetrahydrofuran

[Example 7] PS Fibers (No. 2: Internal Phase Includes Ethyl Acetate)

A solution of the internal phase and a solution of the external phase were each prepared under conditions shown in Table 8, and wet spun fibers (PS fibers) made of a polystyrene were produced using a predetermined double-walled pipe type micronozzle apparatus for wet spun fibers.

The flow rate ratio (external phase flow rate/internal phase flow rate) calculated from the internal phase flow rate and external phase flow rate shown in Table 8 and the fiber diameter and birefringence index of each sample of the PS fibers provided under the conditions are shown in FIG. 8.

TABLE 8

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 7-1 | 40 wt % PS*/EA** | 2 wt % Tween80/ pure water | 30 | 1,000 | 0.53 |
| 7-2 | 40 wt % PS/EA | 2 wt % Tween80/ pure water | 30 | 2,000 | 1.06 |
| 7-3 | 40 wt % PS/EA | 2 wt % Tween80/ pure water | 30 | 3,000 | 1.59 |
| 7-4 | 40 wt % PS/EA | 2 wt % Tween80/ pure water | 30 | 4,000 | 2.12 |
| 7-5 | 40 wt % PS/EA | 2 wt % Tween80/ pure water | 30 | 5,000 | 2.65 |
| 7-6 | 40 wt % PS/EA | 2 wt % Tween80/ pure water | 30 | 6,000 | 3.18 |
| 7-7 | 40 wt % PS/EA | 2 wt % Tween80/ pure water | 30 | 7,000 | 3.71 |
| 7-8 | 40 wt % PS/EA | 2 wt % Tween80/ pure water | 30 | 8,000 | 4.24 |
| 7-9 | 40 wt % PS/EA | 2 wt % Tween80/ pure water | 30 | 9,000 | 4.77 |
| 7-10 | 40 wt % PS/EA | 2 wt % Tween80/ pure water | 30 | 10,000 | 5.31 |

PS*: polystyrene,
EA**: ethyl acetate

[Example 8] Polyvinyl Alcohol (PVA) Fibers

A solution of the internal phase and a solution of the external phase were each prepared under conditions shown in Table 9, and wet spun fibers (PVA fibers) made of a polyvinyl alcohol were produced using a predetermined double-walled pipe type micronozzle apparatus for wet spun fibers. The PVA used in Example 8 (and Example 13 described below) is “POVAL® PVA-217” (KURARAY CO., LTD., degree of polymerization: 1,700, degree of saponification: 87 to 89 mol %).

The flow rate ratio (external phase flow rate/internal phase flow rate) calculated from the internal phase flow rate and external phase flow rate shown in Table 9 and the fiber diameter and birefringence index of each sample of the PVA fibers provided under the conditions are shown in FIG. 9.

TABLE 9

| Sample | Internal phase solution | External phase solution | Internal phase flow rate [μL min$^{-1}$] | External phase flow rate [μL min$^{-1}$] | External phase line speed [m s$^{-1}$] |
|---|---|---|---|---|---|
| 8-1 | 10 wt % PVA*/pure water | 2-propanol | 5 | 4,000 | 2.12 |
| 8-2 | 10 wt % PVA/pure water | 2-propanol | 5 | 5,000 | 2.65 |
| 8-3 | 10 wt % PVA/pure water | 2-propanol | 5 | 6,000 | 3.18 |
| 8-4 | 10 wt % PVA/pure water | 2-propanol | 5 | 7,000 | 3.71 |
| 8-5 | 10 wt % PVA/pure water | 2-propanol | 5 | 8,000 | 4.24 |
| 8-6 | 10 wt % PVA/pure water | 2-propanol | 5 | 9,000 | 4.77 |
| 8-7 | 10 wt % PVA/pure water | 2-propanol | 5 | 10,000 | 5.31 |
| 8-8 | 10 wt % PVA/pure water | 2-propanol | 5 | 11,000 | 5.84 |
| 8-9 | 10 wt % PVA/pure water | 2-propanol | 5 | 12,000 | 6.37 |
| 8-10 | 10 wt % PVA/pure water | 2-propanol | 5 | 13,000 | 6.90 |
| 8-11 | 10 wt % PVA/pure water | 2-propanol | 5 | 14,000 | 7.43 |
| 8-12 | 10 wt % PVA/pure water | 2-propanol | 5 | 15,000 | 7.96 |
| 8-13 | 10 wt % PVA/pure water | 2-propanol | 5 | 16,000 | 8.49 |
| 8-14 | 10 wt % PVA/pure water | 2-propanol | 5 | 17,000 | 9.02 |
| 8-15 | 10 wt % PVA/pure water | 2-propanol | 5 | 18,000 | 9.55 |
| 8-16 | 10 wt % PVA/pure water | 2-propanol | 5 | 19,000 | 10.08 |
| 8-17 | 10 wt % PVA/pure water | 2-propanol | 5 | 20,000 | 10.61 |

PVA*: polyvinyl alcohol

[Example 9] Carbon Nanotube (CNT) Fibers (No. 1: Internal Phase Flow Rate: 5 μL/min, Dispersant: SC)

A solution of the internal phase and a solution of the external phase were each prepared under conditions shown in Table 10, and wet spun fibers (CNT fibers) made of carbon nanotubes were produced using a predetermined double-walled pipe type micronozzle apparatus for wet spun fibers. The CNTs used in Example were single wall carbon nanotubes (SWCNTs) provided by the super-growth technique (manufactured by Nippon Zeon Co., Ltd.).

The flow rate ratio (external phase flow rate/internal phase flow rate) calculated from the internal phase flow rate and external phase flow rate shown in Table 10 and the fiber diameter and birefringence index of each sample of the CNT fibers provided under the conditions are shown in FIG. 10.

TABLE 10

| Sample | Internal phase solution (aqueous dispersion) | External phase solution | Internal phase flow rate [μL min$^{-1}$] | External phase flow rate [μL min$^{-1}$] | External phase line speed [m s$^{-1}$] |
|---|---|---|---|---|---|
| 9-1 | 0.3 wt % CNT*/2.0 wt % SC** | 2-propanol | 5 | 500 | 0.27 |
| 9-2 | 0.3 wt % CNT/2.0 wt % SC† | 2-propanol | 5 | 1,000 | 0.53 |
| 9-3 | 0.3 wt % CNT/2.0 wt % SC† | 2-propanol | 5 | 1,500 | 0.80 |
| 9-4 | 0.3 wt % CNT/2.0 wt % SC† | 2-propanol | 5 | 2,000 | 1.06 |

CNT*: carbon nanotube,
SC**: sodium cholate

[Example 10] CNT Fibers (No. 2: Internal Phase Flow Rate: 10 mL/min, Dispersant: SC)

A solution of the internal phase and a solution of the external phase were each prepared under conditions shown in Table 11, and wet spun fibers (CNT fibers) made of CNTs (the SWCNTs) were produced using a predetermined double-walled pipe type micronozzle apparatus for wet spun fibers.

The flow rate ratio (external phase flow rate/internal phase flow rate) calculated from the internal phase flow rate and external phase flow rate shown in Table 11 and the fiber diameter and birefringence index of each sample of the CNT fibers provided under the conditions are shown in FIG. 11.

TABLE 11

| Sample | Internal phase solution (aqueous dispersion) | External phase solution | Internal phase flow rate [μL min$^{-1}$] | External phase flow rate [μL min$^{-1}$] | External phase line speed [m s$^{-1}$] |
|---|---|---|---|---|---|
| 10-1 | 0.3 wt % CNT*/2.0 wt % SC** | 2-propanol | 10 | 500 | 0.27 |
| 10-2 | 0.3 wt % CNT/2.0 wt % SC | 2-propanol | 10 | 1,000 | 0.53 |
| 10-3 | 0.3 wt % CNT/2.0 wt % SC | 2-propanol | 10 | 1,500 | 0.80 |

CNT*: carbon nanotube,
SC**: sodium cholate

[Example 11] CNT Fibers (No. 3: Winding Speed)

Fibers formed in spinning under the same conditions as Sample 10-1 in Table 11 (internal phase solution, external phase solution, internal phase flow rate, external phase flow rate, and external phase line speed) were wound at a winding speed of 1.9 to 8.4 cm sec$^{-1}$, and the Ih/Iv and stress were measured. The results are shown in FIGS. 12[A] and [B]. The sample of a winding speed at 0 in the figures corresponds to Sample 10-1 in Table 11.

[Example 12] CNT Fibers (No. 4: Internal Phase Flow Rate: 5 mL/min, Dispersant: COD)

A solution of the internal phase and a solution of the external phase were each prepared under conditions shown in Table 12, and wet spun fibers (CNT fibers) made of CNTs (the SWCNTs) were produced using a predetermined double-walled pipe type micronozzle apparatus for wet spun fibers.

TABLE 12

| Sample | Internal phase solution (aqueous dispersion) | External phase solution | Internal phase flow rate [μL $min^{-1}$] | External phase flow rate [μL $min^{-1}$] | External phase line speed [m $s^{-1}$] |
|---|---|---|---|---|---|
| 11-1 | 0.3 wt % CNT*/2.0 wt % DOC** | 2-propanol | 5 | 500 | 0.27 |
| 11-2 | 0.3 wt % CNT/2.0 wt % DOC | 2-propanol | 5 | 1,000 | 0.53 |
| 11-3 | 0.3 wt % CNT/2.0 wt % DOC | 2-propanol | 5 | 1,500 | 0.80 |
| 11-4 | 0.3 wt % CNT/2.0 wt % DOC | 2-propanol | 5 | 2,000 | 1.06 |

CNT*: carbon nanotube,
DOC**: sodium deoxycholate

The flow rate ratio (external phase flow rate/internal phase flow rate) calculated from the internal phase flow rate and external phase flow rate shown in Table 12 and the Ih/Iv and fiber diameter of each sample of the CNT fibers provided under the conditions are shown in FIG. 13.

[Example 13] CNT Fibers (No. 5: Internal Phase Flow Rate: 10 mL/min, Dispersant: COD)

A solution of the internal phase and a solution of the external phase were each prepared under conditions shown in Table 13, and wet spun fibers (CNT fibers) made of CNTs (the SWCNTs) were produced using a predetermined double-walled pipe type micronozzle apparatus for wet spun fibers.

TABLE 13

| Sample | Internal phase solution (aqueous dispersion) | External phase solution | Internal phase flow rate [μL $min^{-1}$] | External phase flow rate [μL $min^{-1}$] | External phase line speed [m $s^{-1}$] |
|---|---|---|---|---|---|
| 12-1 | 0.3 wt % CNT*/2.0 wt % DOC** | 2-propanol | 10 | 500 | 0.27 |
| 12-2 | 0.3 wt % CNT/2.0 wt % DOC | 2-propanol | 10 | 1,000 | 0.53 |
| 12-3 | 0.3 wt % CNT/2.0 wt % DOC | 2-propanol | 10 | 1,500 | 0.80 |

CNT*: carbon nanotube,
DOC**: sodium deoxycholate

The flow rate ratio (external phase flow rate/internal phase flow rate) calculated from the internal phase flow rate and external phase flow rate shown in Table 13 and the Ih/Iv and fiber diameter of each sample of the CNT fibers provided under the conditions are shown in FIG. 14.

[Example 14] CNT Fibers (No. 6: Winding Speed)

Fibers formed in spinning under the same conditions as Sample 11-1 in Table 12 (internal phase solution, external phase solution, internal phase flow rate, external phase flow rate, and external phase line speed) were wound at a winding speed of 1.9 to 8.4 cm $sec^{-1}$, and the Ih/Iv and stress were measured. The results are shown in FIGS. 15[A] and [B]. The sample of a winding speed at 0 in the figures corresponds to Sample 11-1 in Table 12.

[Example 15] Liquid Crystal Polymer (PBLG) Fibers (No. 1)

A solution of the internal phase and a solution of the external phase were each prepared under conditions shown in Table 14, and wet spun fibers (PBLG fibers) made of a liquid crystal polymer: poly(γ-benzyl-L-glutamic acid) were produced using a predetermined double-walled pipe type micronozzle apparatus for wet spun fibers. The PBLG used in the present Example is a commercially available product having a molecular weight of 70,000 to 150,000.

The flow rate ratio (external phase flow rate/internal phase flow rate) calculated from the internal phase flow rate and external phase flow rate shown in Table 14 and the fiber diameter and birefringence index of each sample of the PBLG fibers provided under the conditions are shown in FIG. 16.

TABLE 14

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 13-1 | 8 wt % PBLG*/ chloroform | Ethanol | 10 | 2,000 | 1.06 |
| 13-2 | 8 wt % PBLG*/ chloroform | Ethanol | 10 | 5,000 | 2.65 |
| 13-3 | 8 wt % PBLG*/ chloroform | Ethanol | 10 | 8,000 | 4.25 |
| 13-4 | 8 wt % PBLG*/ chloroform | Ethanol | 10 | 11,000 | 5.84 |
| 13-5 | 8 wt % PBLG*/ chloroform | Ethanol | 10 | 14,000 | 7.43 |

PBLG*: poly (γ -benzyl -L -glutamic acid)

[Example 16] PBLG Fibers (No. 2)

A solution of the internal phase and a solution of the external phase were each prepared under conditions shown in Table 15, and wet spun fibers (PBLG fibers) made of a liquid crystal polymer: poly(γ-benzyl-L-glutamic acid) were produced using a predetermined double-walled pipe type micronozzle apparatus for wet spun fibers. The PBLG used in the present Example is a synthesized product having a molecular weight of about 10,100 provided in accordance with the following polymerization conditions.

Solvent: 1,4-dioxane

Initiator: triethylamine

Monomer/initiator: 50/1

Reaction temperature: 15° C.

Reaction time: 120 h

The flow rate ratio (external phase flow rate/internal phase flow rate) calculated from the internal phase flow rate and external phase flow rate shown in Table 15 and the fiber diameter and birefringence index of each sample of the PBLG fibers provided under the conditions are shown in FIG. 17.

TABLE 15

| Sample | Internal phase solution | External phase solution | Internal phase flow rate [μL min$^{-1}$] | External phase flow rate [μL min$^{-1}$] | External phase line speed [m s$^{-1}$] |
|---|---|---|---|---|---|
| 14-1 | 5 wt % PBLG*/ chloroform | Ethanol | 10 | 2,000 | 1.06 |
| 14-2 | 5 wt % PBLG*/ chloroform | Ethanol | 10 | 5,000 | 2.65 |
| 14-3 | 5 wt % PBLG*/ chloroform | Ethanol | 10 | 8,000 | 4.25 |
| 14-4 | 5 wt % PBLG*/ chloroform | Ethanol | 10 | 11,000 | 5.84 |
| 14-5 | 5 wt % PBLG*/ chloroform | Ethanol | 10 | 14,000 | 7.43 |

PBLG*: poly (γ -benzyl -L -glutamic acid)

[Example 17] PBLG Fibers (No. 3)

A solution of the internal phase and a solution of the external phase were each prepared under conditions shown in Table 16, and wet spun fibers (PBLG fibers) made of a liquid crystal polymer: poly(γ-benzyl-L-glutamic acid) were produced using a predetermined double-walled pipe type micronozzle apparatus for wet spun fibers. The PBLG used in the present Example is a synthesized product identical to that in Example 17.

The flow rate ratio (external phase flow rate/internal phase flow rate) calculated from the internal phase flow rate and external phase flow rate shown in Table 16 and the fiber diameter and birefringence index of each sample of the PBLG fibers provided under the conditions are shown in FIG. 18.

TABLE 16

| Sample | Internal phase solution | External phase solution | Internal phase flow rate [μL min$^{-1}$] | External phase flow rate [μL min$^{-1}$] | External phase line speed [m s$^{-1}$] |
|---|---|---|---|---|---|
| 15-1 | 10 wt % PBLG*/ chloroform | Ethanol | 10 | 2,000 | 1.06 |
| 15-2 | 10 wt % PBLG*/ chloroform | Ethanol | 10 | 5,000 | 2.65 |
| 15-3 | 10 wt % PBLG*/ chloroform | Ethanol | 10 | 8,000 | 4.25 |
| 15-4 | 10 wt % PBLG*/ chloroform | Ethanol | 10 | 11,000 | 5.84 |

PBLG*: poly (γ -benzyl -L -glutamic acid)

[Example 18] PBLG Fibers (No. 4)

A solution of the internal phase and a solution of the external phase were each prepared under conditions shown in Table 17, and wet spun fibers (PBLG fibers) made of a liquid crystal polymer: poly(γ-benzyl-L-glutamic acid) were produced using a predetermined double-walled pipe type micronozzle apparatus for wet spun fibers. The PBLG used in the present Example is a synthesized product identical to that in Example 17.

The flow rate ratio (external phase flow rate/internal phase flow rate) calculated from the internal phase flow rate and external phase flow rate shown in Table 17 and the fiber diameter and birefringence index of each sample of the PBLG fibers provided under the conditions are shown in FIG. 19.

TABLE 17

| Sample | Internal phase solution | External phase solution | Internal phase flow rate [μL min$^{-1}$] | External phase flow rate [μL min$^{-1}$] | External phase line speed [m s$^{-1}$] |
|---|---|---|---|---|---|
| 16-1 | 15 wt % PBLG*/ chloroform | Ethanol | 10 | 2,000 | 1.06 |
| 16-2 | 15 wt % PBLG*/ chloroform | Ethanol | 10 | 5,000 | 2.65 |
| 16-3 | 15 wt % PBLG*/ chloroform | Ethanol | 10 | 8,000 | 4.25 |
| 16-4 | 15 wt % PBLG*/ chloroform | Ethanol | 10 | 11,000 | 5.84 |

PBLG*: poly (γ -benzyl -L -glutamic acid)

[Example 19] Polystyrene (PS) Film

A solution of the internal phase and a solution of the external phase were each prepared under conditions shown in Table 18, and a wet formed film (PS film) made of a polystyrene was produced using a predetermined double-walled pipe type micronozzle apparatus for a wet formed film. However, under the conditions for Samples 17-6 and 17-7, clogging of the device occurred, and thus, no PS film product could be provided.

TABLE 18

| Sample | Internal phase solution | External phase solution | Internal phase flow rate [μL min$^{-1}$] | External phase flow rate [μL min$^{-1}$] | External phase line speed [m s$^{-1}$] |
|---|---|---|---|---|---|
| 17-1 | 30 wt % PS*/THF** | pure water | 110 | 12,730 | 0.53 |
| 17-2 | 30 wt % PS/THF | pure water | 110 | 25,470 | 1.06 |
| 17-3 | 30 wt % PS/THF | pure water | 110 | 38,200 | 1.59 |
| 17-4 | 30 wt % PS/THF | pure water | 110 | 50,930 | 2.12 |
| 17-5 | 30 wt % PS/THF | pure water | 110 | 63,660 | 2.65 |
| 17-6 | 30 wt % PS/THF | pure water | 55 | 6,370 | 0.27 |
| 17-7 | 30 wt % PS/THF | pure water | 55 | 12,730 | 0.53 |
| 17-8 | 30 wt % PS/THF | pure water | 55 | 19,100 | 0.80 |
| 17-9 | 30 wt % PS/THF | pure water | 55 | 25,470 | 1.06 |
| 17-10 | 30 wt % PS/THF | pure water | 55 | 31,830 | 1.33 |
| 17-11 | 30 wt % PS/THF | pure water | 55 | 38,200 | 1.59 |

PS*: polystyrene,
THF**: tetrahydrofuran

SEM images of the PS film products when the external phase flow rate was changed under conditions with the internal phase flow rate fixed at 110 μL/min in accordance with Samples 17-1 to 17-5 are shown in FIG. 21[A]. As can be seen from the figure, a film (fibers in a film form) can be provided under any of the conditions, and as can be seen from (d), (f), (h), and (j), each of the films has a nano-sized thickness and can be called a "nanofilm".

The relationship between the flow speed of the external phase (continuous phase) and the thickness of the PS film in Samples 17-1 to 17-5 is shown in FIG. 21[B]. As can be seen from this figure, the thickness of the film tends to decrease as the external phase flow rate increases, and a film having a thickness of 200 nm at the minimum (nanofilm) was provided.

SEM images of the PS film products when the external phase flow rate was changed under conditions with the internal phase flow rate fixed at 55 μL/min in accordance with Samples 17-8 to 17-11 are shown in FIG. 22[A]. When the external phase flow rate was set to 19,100 to 38,200 μL/min, nanofilms were obtained without clogging of the device.

The relationship between the external phase flow rate and the thickness of the PS film in Samples 17-8 to 17-11 is shown in FIG. 22[B]. The thickness of the film decreased as the external phase flow rate increased, but substantially no change was observed under the conditions of an external phase flow rate of 25,470 μL/min or more (Samples 17-9 to 17-11).

The results described above suggested that PS nanofilms can be formed by the production method of the present invention (wet film formation process) and the film thickness thereof can be controlled by changing the flow rate of the external phase (continuous phase).

[Example 20] Poly-DL-Lactic Acid (PDLLA) Film

A solution of the internal phase and a solution of the external phase were each prepared under conditions shown in Table 19, and a wet formed film (PDLLA film) made of a poly-DL-lactic acid was produced using a predetermined double-walled pipe type micronozzle apparatus for a wet formed film.

TABLE 19

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 18-1 | 5 wt % PDLLA*/ 1,4-Dioxane | pure water | 110 | 12,730 | 0.53 |
| 182 | 20 wt % PDLLA/THF** | pure water | 110 | 76,390 | 3.18 |
| 18-3 | 15 wt % PDLLA/THF | pure water | 110 | 12,730 | 0.53 |
| 18-4 | 15 wt % PDLLA/THF | pure water | 110 | 25,470 | 1.06 |
| 18-5 | 15 wt % PDLLA/THF | pure water | 110 | 38,200 | 1.59 |
| 18-6 | 15 wt % PDLLA/THF | pure water | 110 | 50,930 | 2.12 |
| 18-7 | 15 wt % PDLLA/THF | pure water | 110 | 76,390 | 3.18 |

PDLLA*: poly-D,L- lactic acid,
THF**: tetrahydrofuran

SEM images of the PDLLA film products subjected to the conditions shown in Sample 18-1 are shown in FIG. 23. The thickness of the film was about 340 nm under the conditions.

SEM images of the PDLLA film products subjected to the conditions shown in Sample 18-2 are shown in FIG. 24. The thickness of the film was about 200 nm under the conditions.

SEM images of the PDLLA film products when the external phase flow rate was changed under conditions with the internal phase flow rate fixed at 110 μL/min in Samples 18-3 to 18-7 are shown in FIG. 25[A]. The relationship between the external phase flow rate and the thickness of the PDLLA film in Samples 18-3 to 18-7 is shown in FIG. 25[B]. The PDLLA nanofilm was provided under any of the conditions.

[Example 21] Polyvinyl Alcohol (PVA) Film

A solution of the internal phase and a solution of the external phase were each prepared under conditions shown in Table 20, and a wet formed film (PVA film) made of a polyvinyl alcohol was produced using a predetermined double-walled pipe type micronozzle apparatus for a wet formed film. However, under conditions for Sample 19-1, clogging of the device occurred, and thus, no PVA film product could be provided.

TABLE 20

| Sample | Internal phase solution | External phase solution | Internal phase flow rate [μL $min^{-1}$] | External phase flow rate [μL $min^{-1}$] | External phase line speed [m $s^{-1}$] |
|---|---|---|---|---|---|
| 19-1 | 10 wt % PVA*/pure water | 2-propanol | 57 | 12,730 | 0.53 |
| 19-2 | 10 wt % PVA*/pure water | 2-propanol | 57 | 25,470 | 1.06 |
| 19-3 | 10 wt % PVA*/pure water | 2-propanol | 57 | 38,200 | 1.59 |
| 19-4 | 10 wt % PVA*/pure water | 2-propanol | 57 | 50,930 | 2.12 |
| 19-5 | 10 wt % PVA*/pure water | 2-propanol | 57 | 63,660 | 2.65 |

PVA*: polyvinyl alcohol

SEM images of the PVA film products when the external phase flow rate was changed under conditions with the internal phase flow rate fixed at 57 μL/min in Samples 19-2 to 19-5 are shown in FIG. 26[A]. The relationship between the external phase flow rate and the thickness of the PVA film in Samples 19-1 to 19-5 is shown in FIG. 26[B]. The PVA nanofilm was provided under any of the conditions.

The invention claimed is:

1. A method for producing wet spun fibers using a double-walled pipe type micronozzle apparatus, wherein in a step of extruding an internal phase comprising a fiber material and a good solvent for the fiber material in a linear form from a circular end of an internal pipe of the apparatus into an external phase comprising a poor solvent for the fiber material, the external phase flowing in an external pipe of the apparatus, an external phase line speed at an orifice portion at which the internal phase and the external phase merge is 0.1 $ms^{-1}$ or more, and a ratio of a flow rate of the external phase to a flow rate of the internal phase is 1 or more, wherein the fiber material is:

a polyamide resin selected from the group consisting of an aramid and a polyamide acid (polyamic acid);

a polyester resin selected from the group consisting of polyethylene terephthalate (PET), polyethylene naphthalate (PEN), polytrimethylene terephthalate (PTT), polybutylene terephthalate (PBT), polybutylene naphthalate (PBN), polyglycolic acid, polycaproic acid, polyhydroxybutyric acid, polybutylene succinate, and polyhydroxyalkanoates;

a cellulose derivative selected from the group consisting of cellulose acetate, cellulose propionate, cellulose nitrate, ethyl cellulose, and carboxy methyl cellulose;

a vinyl resin; or a carbon material selected from the group consisting of carbon fibers, graphene, fullerenes and derivatives thereof.

2. The method for producing wet spun fibers according to claim 1, wherein the fiber material is the polyamide resin, the external phase line speed is 0.1 $ms^{-1}$ or more, and the ratio of the flow rate of the external phase to the flow rate of the internal phase is 10 or more.

3. The method for producing wet spun fibers according to claim 1, wherein the fiber material is the polyester resin, the external phase line speed is 0.1 $ms^{-1}$ or more, and the ratio of the flow rate of the external phase to the flow rate of the internal phase is 10 or more.

4. The method for producing wet spun fibers according to claim 1, wherein the fiber material is the cellulose derivative, the external phase line speed is 0.1 $ms^{-1}$ or more, and the ratio of the flow rate of the external phase to the flow rate of the internal phase is 10 or more.

5. The method for producing wet spun fibers according to claim 1, wherein the fiber material is the vinyl resin, the external phase line speed is 0.1 $ms^{-1}$ or more, and the ratio of the flow rate of the external phase to the flow rate of the internal phase is 10 or more.

6. The method for producing wet spun fibers according to claim 1, wherein the fiber material is the carbon material, the external phase line speed is 0.1 $ms^{-1}$ or more, and the ratio of the flow rate of the external phase to the flow rate of the internal phase is 10 or more.

* * * * *